United States Patent
Huang et al.

(10) Patent No.: US 10,805,004 B2
(45) Date of Patent: Oct. 13, 2020

(54) REDUCING SUPPLY VOLTAGES OF OPTICAL TRANSMITTER DEVICES

(71) Applicant: Hewlett Packard Enterprise Development LP, Houston, TX (US)

(72) Inventors: Tsung Ching Huang, Palo Alto, CA (US); Rui Wu, Palo Alto, CA (US); Nan Qi, Palo Alto, CA (US); Mir Ashkan Seyedi, Palo Alto, CA (US); Marco Fiorentino, Mountain View, CA (US); Raymond G. Beausoleil, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/495,187

(22) PCT Filed: Apr. 7, 2017

(86) PCT No.: PCT/US2017/025861
§ 371 (c)(1),
(2) Date: Sep. 18, 2019

(87) PCT Pub. No.: WO2018/186833
PCT Pub. Date: Oct. 11, 2018

(65) Prior Publication Data
US 2020/0145100 A1 May 7, 2020

(51) Int. Cl.
*H04B 10/00* (2013.01)
*H04B 10/079* (2013.01)
(Continued)

(52) U.S. Cl.
CPC ..... *H04B 10/07955* (2013.01); *H04B 10/506* (2013.01); *H04B 10/541* (2013.01)

(58) Field of Classification Search
CPC ........................................................ H04B 10/50
See application file for complete search history.

(56) References Cited

U.S. PATENT DOCUMENTS

| 6,570,893 | B1 | 5/2003 | Libatique |
| 7,848,369 | B1 | 12/2010 | Bostak et al. |
| (Continued) | | | |

FOREIGN PATENT DOCUMENTS

| JP | 2015076581 | 4/2015 |
| WO | WO-2016078705 | 5/2016 |

OTHER PUBLICATIONS

P, Kapur ei a!., "Minimizing power dissipation in optical interconnects at low voltage using optima! modulator design"; Jul. 18, 2005, pp. 1713-1721 (Year: 2005).*

(Continued)

*Primary Examiner* — Daniel G Dobson
(74) *Attorney, Agent, or Firm* — Hewlett Packard Enterprise Patent Department

(57) ABSTRACT

Examples described herein relate to reducing a magnitude of a supply voltage for a circuit element of an optical transmitter device. In some such examples, the circuit element is a driving element that is to receive a first electrical data signal and to provide a second electrical data signal to an optical element that is to provide an optical data signal. A testing element is to compare the optical data signal to the first electrical data signal to determine whether the optical transmitter device meets a performance threshold. When the device meets the performance threshold, a regulating element is to reduce a magnitude of the supply voltage of the driving element.

15 Claims, 14 Drawing Sheets

(51) Int. Cl.
*H04B 10/50* (2013.01)
*H04B 10/54* (2013.01)
*H04J 14/00* (2006.01)

(56) References Cited

U.S. PATENT DOCUMENTS

| | | |
|---|---|---|
| 9,031,412 B2 | 5/2015 | Nagarajan et al. |
| 2010/0008662 A1 | 1/2010 | Bradbeer |
| 2014/0186056 A1* | 7/2014 | Nuttgens ............... H04B 10/564 |
| | | 398/197 |
| 2015/0215043 A1 | 7/2015 | Debregeas |
| 2017/0359119 A1* | 12/2017 | Li ....................... H04B 10/6931 |
| 2018/0062749 A1* | 3/2018 | Rector ................. H04B 10/564 |

OTHER PUBLICATIONS

HFTA-08.0: Receivers and Transmitters in DWDM Systems, Jun. 22, 2004, 7 pages, <https://www.maximintegrated.com/en/app-notes/index.mvp/id/3258>.

P. Kapur et al., "Minimizing power dissipation in optical interconnects at low voltage using optimal modulator design"; Jul. 18, 2005, pp. 1713-1721.

International Search Report and Written Opinion received for PCT Application No. PCT/US2017/25861, dated Dec. 22, 2017, 13 pages.

* cited by examiner

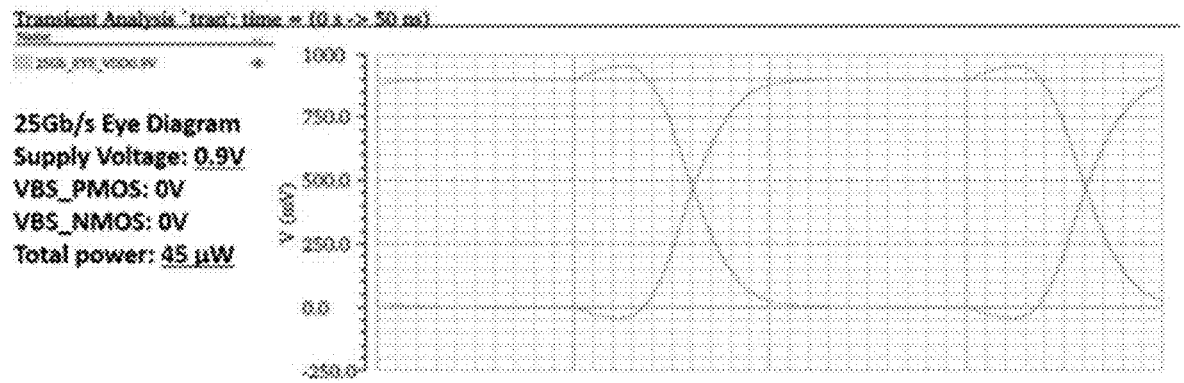
FIG. 8A-1
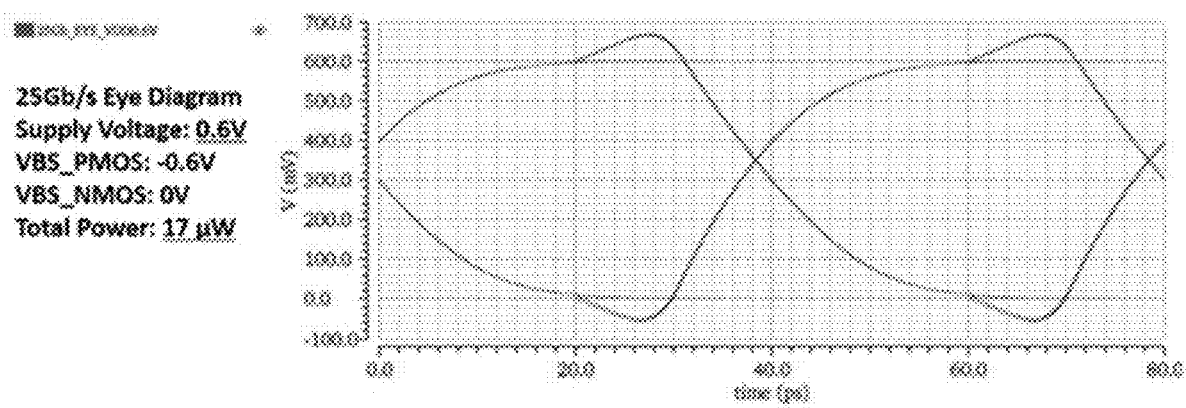
FIG. 8A-2
FIG. 8A

REDUCING SUPPLY VOLTAGES OF OPTICAL TRANSMITTER DEVICES

STATEMENT OF GOVERNMENT INTEREST

This invention was made with Government support under Agreement Number H98230-14-3-0011. The Government has certain rights in the invention.

BACKGROUND

Optical transmitter devices play a critical role in modern communications technology. An optical transmitter device may operate at a supply voltage and a body bias voltage to receive an electrical data signal and to produce an optical data signal. This signal may for example facilitate a dense-wavelength division multiplexing (DWDM) optical link. The optical transmitter device may include elements such as a driving element, a testing element, and a regulating element, as well as an integrated circuit. The device may be able to determine whether operation meets a performance threshold at a set of operating settings.

BRIEF DESCRIPTION OF THE DRAWINGS

Certain examples are described in the following detailed description with reference to the drawings, of which:

FIGS. 8A-8C are example chart diagrams of the performance of an optical transmitter device performing according to examples of the present disclosure.

DETAILED DESCRIPTION

Figure 1:
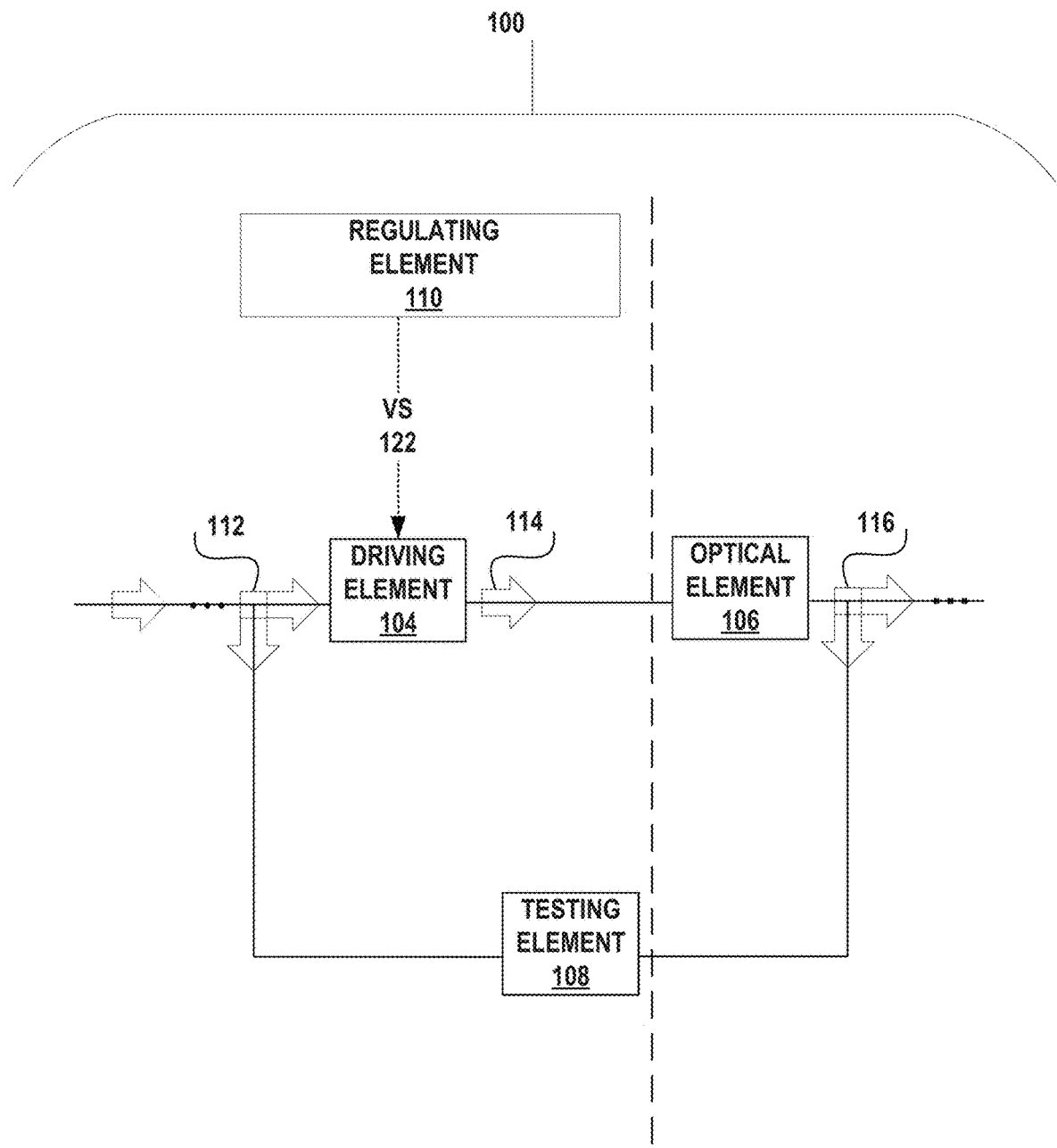
FIG. 1 is a block diagram of an optical transmitter device, according to some examples of the present disclosure.

An optical transmitter device provides for communication of a data signal by receiving an electrical data signal and producing in response an optical data signal capable of transmission via an optical medium. In general, the optical transmitter device may include an integrated circuit and circuit elements such as a driving element, an optical element, a testing element, and a regulating element. The optical transmitter device may operate at a set of operating settings including a supply voltage of a circuit element of the device. The optical transmitter device may include a multiplexing element to facilitate wavelength-division multiplexing (WDM), thereby allowing for transmission of a plurality of optical signals over a single optical line by using different wavelengths for the optical signals. Such WDM may be analogous to how a radio transmitter device may apply frequency-division multiplexing (FDM). In general, dense WDM (DWDM) may refer to spacing wavelengths more closely to increase an overall channel capacity of such an optical transmitter device.

Such an optical transmitter device, or an integrated chip of such a device, may operate at a nominal supply voltage that may be set to a highest possible supply voltage to ensure that its performance is best able to meet a performance threshold. For example, the nominal supply voltage may be set by a manufacturer or in fabrication of the integrated chip. However, operation at the nominal supply voltage may require the device to consume more power than it needs to meet the performance threshold within its actual operating conditions. Thus, it would be desirable to reduce the supply voltage adaptively within the actual operating conditions of the device, so long as it may also continue to meet the performance threshold.

The set of operating settings of the optical transmitter device may include a body bias voltage of the circuit element of the device, in addition to the supply voltage of the circuit element of the device. Body bias voltage may refer to the change in a threshold voltage of a transistor that results from a voltage difference between the source and the body of the transistor. Body bias voltage may be achieved by connecting the body of the transistor to a bias network rather than to power or ground. Such a body bias voltage may be supplied from either an external or internal source relative to the transistor. The body bias voltage may also be independent of the supply voltage and/or regulated independently of the supply voltage.

Examples in the present disclosure provide for reducing a supply voltage of an integrated circuit and/or an optical transmitter device. In several such examples, the circuit receives an input of an electrical data signal, produces an output of an optical data signal, and determines whether it meets a performance threshold when operating at a set of operating settings that includes a supply voltage. When it meets the performance threshold, the circuit reduces the supply voltage. The device may reduce the supply voltage by a predetermined or set amount of magnitude, such as a small decrement. A testing element of the circuit may compare the optical data signal to the electrical data signal to determine whether the device meets the performance threshold. A regulating element of the circuit may reduce the supply voltage when the circuit meets the performance threshold. The testing element may send an instruction to the regulating element to cause the regulating element to reduce the supply voltage. The supply voltage may correspond to a different circuit element of the circuit, such as a driving element. The testing element may also store or cause to be stored each change to the set of operating settings of the circuit. When the circuit meets the performance threshold at a set of operating settings, it may store the set as a known-good set.

In several such examples, the circuit again determines after reducing the supply voltage, in substantially the same manner as before, whether it still meets the performance threshold. The circuit may continue to reduce the supply voltage, for example by decrements, until the circuit determines that it does not meet the performance threshold. In several such examples, when the circuit does not meet the performance threshold at a given supply voltage, the circuit increases a body bias voltage of the circuit. The body bias voltage may be independent of the supply voltage. The circuit may increase the body bias voltage by a predetermined or set amount of magnitude. Such an increase in the body bias voltage may allow the circuit to meet the performance threshold at the given supply voltage and with less overall power consumed than would result from merely increasing the supply voltage.

In several such examples, the circuit again determines after increasing the body bias voltage, in substantially the same manner as before, whether it again meets the performance threshold. If it does, the circuit may continue to reduce the supply voltage. If it does not, the circuit may continue to increase the body bias voltage, for example by increments, until either it meets the performance threshold or it determines both that it fails to meet the performance threshold and that it exceeds an operating limit, such as a maximum body bias voltage. The operating limit may be predetermined, or it may be determined during operation, including through measurement by the testing element. In some such examples, when the circuit determines both that it fails to meet the performance threshold and that it exceeds an operating limit, the circuit may restore a known-good set, including a setting of the supply voltage setting and a setting of the body bias voltage, before it continues with operation at the known-good set. The circuit may also inactivate the testing element after restoring the known-good set. This method benefits the overall operation of the circuit and/or the device, for example by determining a known-good set of operating settings including a supply voltage and/or a body bias voltage at which the circuit and/or device continues to meet the performance threshold with less of a supply voltage and/or less overall power consumed than at the nominal supply voltage. In these ways and others, the examples described herein may improve operation of an integrated circuit and/or an optical transmitter device.

The examples of the present disclosure are described with reference to the following figures. Unless noted otherwise, the figures and their accompanying description are non-limiting, and no element is characteristic of any particular example. In that regard, features from one example may be freely incorporated into other examples without departing from the spirit and scope of the present disclosure.

An optical transmitter device for use with the present disclosure is described with reference to FIG. 1. In that regard, FIG. 1 is a block diagram of an optical transmitter device 100, according to some examples of the present disclosure. The optical transmitter device 100 includes a driving element 104, an optical element 106, a testing element 108, and a regulating element 110, which may be connected in any suitable combination and within an optical transmitter device 100 of any size, shape, configuration, and material. The optical transmitter device 100 may include a combination of digital and analog elements and any combination of other elements, including other elements suitable to an integrated circuit. The optical transmitter device 100 may operate to facilitate an optical link, including a dense-wavelength division multiplexing (DWDM) optical link. The optical transmitter device 100 may operate at a set of operating settings, which settings may differ between elements of the device 100. The device 100 may allow for the settings of each and/or any illustrated element to be regulated independently of each and/or any other illustrated element. The set of operating settings may include a setting of a supply voltage and/or a setting of a body bias voltage of the device 100.

Driving element 104 illustrates a suitable element of any size, shape, and configuration that may receive a first electrical data signal 112 and provide a second electrical data signal 114 to the optical element 106. The first electrical data signal 112 may run both to the driving element 104 as well as to the testing element 108, as illustrated by FIG. 1. The driving element 104 may operate with a set of settings, including a supply voltage (VS) 112 and/or a body bias voltage. While illustrated as a single entity, the driving element 104 may include a single circuit element, a plurality of discrete circuit elements, or any permutation thereof. In various examples, the driving element 104 may include various forms such as amplifiers, filters, equalizers, and/or other suitable forms that shape an input electrical data signal, each of which may receive an input electrical data signal and output a shaped electrical data signal. The driving element 104 may couple to the optical element 106 and to an input line as illustrated in FIG. 1 as well as to other elements of the optical transmitter device 100, such as the testing element 108 and the regulating element 110. When the driving element 104 includes a plurality of circuit elements, each circuit element of the plurality may receive an input electrical signal, may output a shaped electrical signal, and/or may operate at a supply voltage that is independent of the supply voltages of any and/or all other circuit elements.

The driving element 104 may operate with other suitable settings of the optical transmitter device 100, including tap ratios, passband, shape factors, phase factors, and/or other settings suitable to a filter and/or frequency ranges, weights, and/or other settings suitable to an equalizer and/or amplifier. These settings may be independent of supply voltage 122 and regulated independently of supply voltage 122 and/or of each other.

Optical element 106 illustrates a suitable element of any size, shape, and configuration that may receive a second electrical data signal 114 from the driving element 104 and may provide an optical data signal 116 in response. The optical data signal 116 may run both to the testing element 108 as well as to an output line, as illustrated by FIG. 1. While illustrated as a single entity, the optical element 106 may include a single circuit element, a plurality of discrete circuit elements, or any permutation thereof. In various examples, the optical element 106 may include various forms such as a microring and/or other suitable modulator element, a heater and/or other suitable control element, a photodetector and/or other suitable converter element, and/or other suitable elements to process an optical signal. The optical element 106 may couple to the driving element 104 as well as to other elements of the optical transmitter device 100, such as the testing element 108 and the regulating element 110. The optical element 106 may operate at a voltage independent of the supply voltage (VS) 122 of the driving element and/or other elements of the optical transmitter device 100, as illustrated in FIG. 1 by the dividing line. When the optical element 106 includes a plurality of circuit elements, each circuit element of the plurality may couple to other circuit elements independently and may operate at a supply voltage that is independent of any and/or all other circuit elements.

Testing element 108 illustrates a suitable element of any size, shape, and configuration that may compare the optical data signal 116 to the first electrical signal 112 to determine whether the optical transmitter device 100 meets a performance threshold. While illustrated with a direct line in FIG. 1, the testing element 108 may receive the optical data signal 116 from the optical element 106 after other circuit elements amplify or otherwise modify the optical data signal 116. In some examples, other circuit elements convert the optical data signal 116 to an electrical data signal and amplify the resulting electrical data signal before the testing element 108 receives the optical data signal 116. While illustrated as a single entity, the testing element 108 may include a single circuit element, a plurality of discrete elements, or any permutation thereof. In various examples, the testing element 108 may include various forms such as a built-in self-tester (BIST), a bit error rate (BER) test, and/or other suitable forms that compare a signal to a performance threshold. The testing element 108 may couple to the driving element 104 and/or to the optical element 106, as well as to other elements of the optical transmitter device 100, including the regulating element 110. The testing element 108 may operate at a voltage independent of the supply voltage (VS) 122 of the driving element 104 and/or other elements of the optical transmitter device 100. When the testing element 108 includes a plurality of circuit elements, each circuit element of the plurality may couple to other circuit elements independently and may operate at a supply voltage that is independent of any and/or all other circuit elements.

The testing element 108 may compare the optical data signal 116 to the first electrical signal 112 by any suitable comparison test, including one or more of a data rate, a bit error rate (BER), and an extinction ratio (ER). The testing element 108 may compare the optical data signal 116 to the first electrical signal 112 that is stored by a storage device. In several examples of the present disclosure, the testing element 108 determines that the optical transmitter device 100 has failed to meet the performance threshold when it fails such a comparison test. The testing element 108 may also measure the performance threshold and/or an operating limit of the optical transmitter device 100 independently of how it receives the optical data signal 116. The testing element 108 may include a processor to facilitate these or other suitable operations during its operation.

Regulating element 110 illustrates a suitable element of any size, shape, and configuration that may cause a reduction in a magnitude of the supply voltage 122 of the driving element 104. In several examples of the present disclosure, the regulating element 110 causes a reduction in the magnitude of the supply voltage 122 of the driving element 104 when the optical transmitter device 100 meets the performance threshold. While illustrated as a single entity, the regulating element 110 may include a single circuit element, a plurality of discrete circuit elements, or any permutation thereof. In various examples, the regulating element 110 includes various forms such as a voltage regulator, a low-dropout (LDO) regulator, and/or other suitable forms that regulate a magnitude of voltage. The regulating element 110 may couple to the driving element 104, as well as to other elements of the optical transmitter device 100, such as the testing element 108 and the optical element 106. When the regulating element 110 includes a plurality of circuit elements, each circuit element of the plurality may couple to other circuit elements independently and may operate at a supply voltage that is independent of the other circuit elements. When the driving element 104 includes a plurality of components, each operating at a supply voltage, the regulating element 110 may be able to reduce a magnitude of the supply voltage of each component of the plurality independently of the supply voltages of other components and/or circuit elements.

The regulating element 110 may cause a reduction in the magnitude of the supply voltage 122 of the driving element 104 by any suitable control method. While illustrated with a direct line in FIG. 1, the regulating element 110 may cause a reduction in the magnitude of the supply voltage 122 of the driving element 104 via other circuit elements that modify or otherwise transmit to the driving element 104 an instruction, effect, or an operation directly controlled by the regulating element 110. The regulating element 110 may collaborate with the testing element 108 to reduce the supply voltage 122, and this may also include changing one or more other settings of the optical transmitter device 100 by any of the regulating element 110, the testing element 108, and/or other suitable circuit elements.

The optical transmitter device 100 may include the illustrated elements of FIG. 1 within an integrated circuit. In several examples of the present disclosure, the optical transmitter device 100 includes one or more metal-oxide-semiconductor field-effect transistors (MOSFETs) fabricated on a complimentary metal-oxide semiconductor (CMOS) chip, to enable a digital logic circuit and/or to facilitate an optical link with the illustrated circuit elements of FIG. 1. In general a MOSFET may include terminals such as gate, body, source, and drain. A CMOS chip may combine complementary MOSFETS, such as an n-channel MOSFET (NMOS) and a p-channel MOSFET (PMOS), within a single substrate, for example as a CMOS inverter in which the NMOS and PMOS connect to the gate and drain. In general, the integrated circuit of the optical transmitter device 100 may be characterized as consuming dynamic power P while operating at operating frequency $f_{op}$, supply voltage $V_{DD}$, and a given parasitic capacitance $C_{par}$, wherein a transistor of the circuit operates at threshold voltage $V_{th}$, drain current $I_{DS}$, supply voltage $V_{GS}$, body bias voltage $V_{BS}$, and operation speed $V_C$. The dynamic power P consumed by the circuit then relates to these characteristics of the circuit according to the following equations:

$$P \propto C_{par} \cdot V_{DD}^2 \cdot f_{op} \qquad (1)$$

$$\frac{\partial V_C}{\partial t} \propto \frac{I_{DS}}{C_{par}} \qquad (2)$$

$$I_{DS} \propto (V_{GS} - V_{TH})^\alpha \qquad (3)$$

$$V_{TH} \propto (V_{BS} + \varphi_F)^{0.5} \qquad (4)$$

In general, a CMOS chip may use a high operating frequency $f_{op}$ to operate as a high-speed circuit, including as a circuit that may facilitate a DWDM optical link. In several examples of the present disclosure, the optical transmitter device 100 may include a CMOS chip that runs at 10 GHz or faster to operate as a high-speed circuit with the illustrated elements of FIG. 1. The dynamic power P may account for 99% or more of total power consumption in such a high-speed circuit due to the high operating frequency $f_{op}$, such that a leakage power loss at drain and/or substrate of the transistor is negligible. As equation (1) indicates, the circuit may reduce its dynamic power P consumption at a given operating frequency $f_{op}$ by reducing the supply voltage $V_{DD}$ of the circuit. In contrast to the supply voltage $V_{DD}$ that the circuit may vary in operation, parasitic capacitance $C_{par}$ may depend on factors set during fabrication of the circuit, such as the CMOS chip design and/or the masking qualities of the transistor.

However, as equations (2)-(3) indicate, the drain current $I_{DS}$ of the transistor may decrease with a decrease in the supply voltage $V_{GS}$, and this may impact the operation speed $V_C$ of the transistor and/or of the circuit, which represents its charge/discharge time to the given parasitic capacitance $C_{par}$. As equation (3) indicates, the circuit may reduce the threshold voltage $V_{th}$ of the transistor to maintain thereby the operation speed $V_C$ at a lower supply voltage $V_{GS}$. Finally as equation (4) indicates, the threshold voltage $V_{th}$ may depend on the body bias voltage $V_{BS}$ of the transistor. Thus, the circuit may increase the body bias voltage $V_{BS}$ to maintain the drain current $I_{DS}$ and the operation speed $V_C$ while it reduces the supply voltage $V_{GS}$, because the increase in the body bias voltage $V_{BS}$ may result in a decrease in the threshold voltage $V_{th}$. In this manner, the circuit may continue to meet a performance threshold at a lower supply voltage $V_{DD}$ and/or with less dynamic power P consumed overall.

When the circuit increases a body bias voltage $V_{BS}$ in this manner, a resulting cost incurred to its operation may be an increase in leakage current at the drain and/or source of the transistor. However, this increase may remain a negligible level in a high-speed circuit, as the overall amount of leakage current may account for less than 1% of the total power use at the nominal supply voltage, as mentioned above. Thus, the circuit may have a range over which it may increase the body bias voltage before leakage current may affect performance such that it causes the circuit to fail a performance threshold and/or exceed an operating limit. Therefore, the circuit may increase body bias voltage up to a maximum of an operating range.

Figure 2:
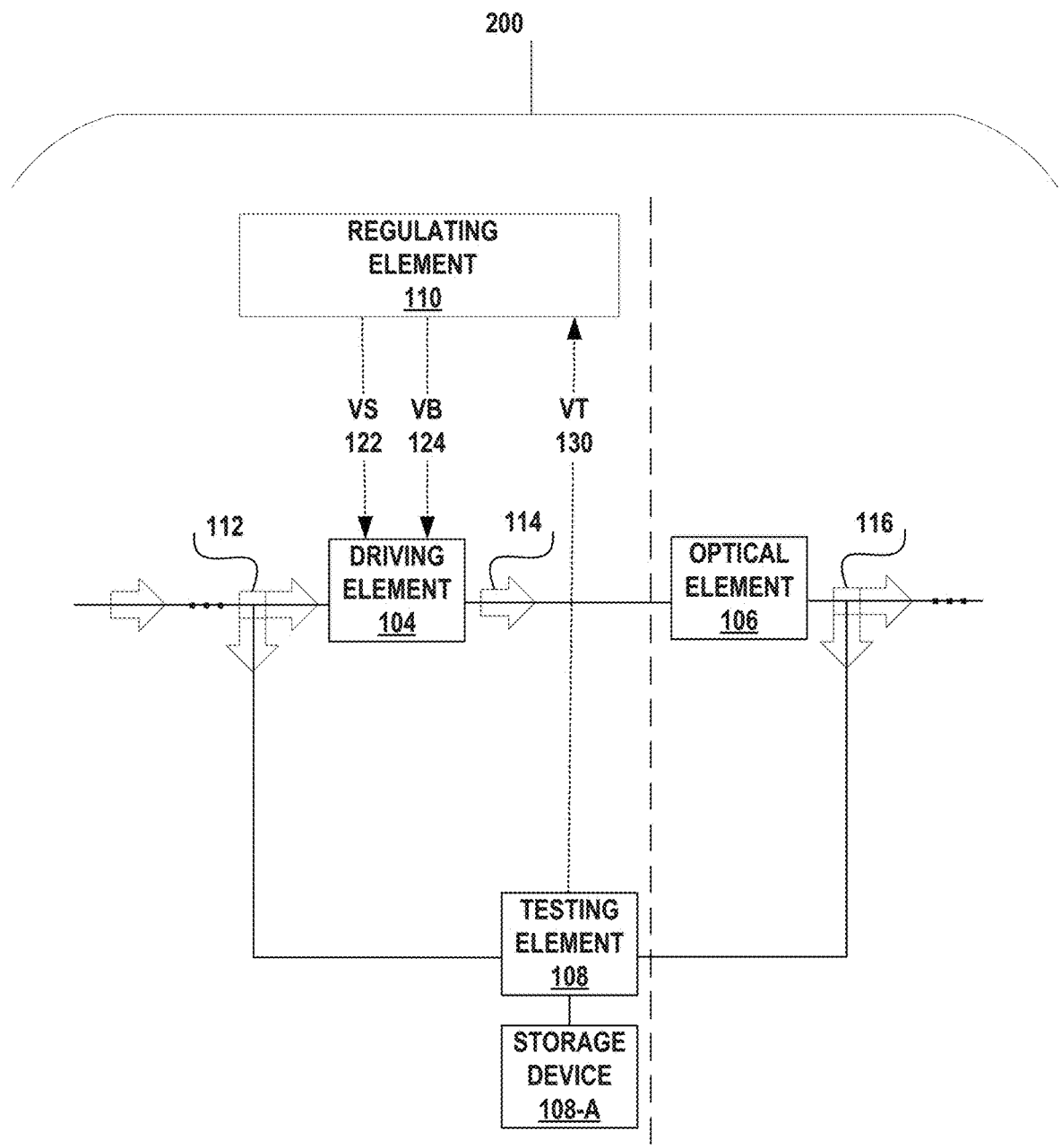
FIG. 2 is a block diagram of the optical transmitter device of FIG. 1, including additional features according to some examples of the present disclosure.

Further examples of the present disclosure are discussed with reference to FIG. 2. In that regard, FIG. 2 is a block diagram of the optical transmitter device 100 of FIG. 1, including additional features according to some examples of the present disclosure. In detail, FIG. 2 illustrates the optical transmitter device 100, wherein the driving element 104 also operates at a body bias voltage (VB) 124, the regulating element 110 operates at a threshold voltage (VT) 130, and/or the testing element 108 couples to storage device 108-A.

The driving element 104 may operate at the supply voltage 122 and at the body bias voltage 124 simultaneously. The body bias voltage 124 may be independent of the supply voltage 122 and/or other voltages of the optical transmitter device 100. Similarly, the regulating element 110 may cause a reduction in magnitude of the body bias voltage 124 independently of the magnitude of the supply voltage 122 of the driving element 104, and/or it may cause a reduction in magnitude of the supply voltage 122 independently of the magnitude of the body bias voltage 124 of the driving element 104.

The regulating element 110 may receive an instruction from the testing element 108 that causes the regulating element 110 to reduce the magnitude of the supply voltage 122 and/or to increase the magnitude of the body bias voltage 124 of the driving element 104. In various examples of the present disclosure, the regulating element 110 receives an instruction from the testing element 108 to cause a reduction in magnitude of the supply voltage 122 when the optical transmitter device 100 meets the performance threshold; alternatively, when the optical transmitter device 100 fails to meet the performance threshold, the regulating element receives an instruction from the testing element 108 to cause an increase in magnitude of the body bias voltage 124. While illustrated with a direct line in FIG. 2, the testing element 108 may communicate with the regulating element 110 along any suitable pathway of circuit elements that facilitates a communicative coupling.

The threshold voltage 130 of the regulating element 110 may be independent of the supply voltage 122 and/or the body bias voltage 124 of the driving element 104 and/or of other voltages of the optical transmitter device 100. In various examples of the present disclosure, the regulating element 110 receives an instruction from the testing element 108 to modify the threshold voltage 130, which causes the regulating element 110 to reduce in magnitude the supply voltage 122 and/or to increase in magnitude the body bias voltage 124 of the driving element 104. In various examples of the present disclosure, the regulating element 110 is a low-dropout (LDO) regulator operating at a setting of the threshold voltage 130. The threshold voltage 130 may be an input to a transistor of the regulating element 110.

The storage device 108-A illustrates a suitable element of any size, shape, format, and configuration that may store the first electrical data signal 112, the optical data signal 116, and/or other suitable settings of the optical transmitter device 100, including a setting of the supply voltage 122 and a setting of the body bias voltage 124 at which the driving element 104 of the device 100 operated to produce the optical data signal 116. While illustrated with a direct line in FIG. 2, the storage device 108-A may communicate with the testing element 108 along any suitable pathway of circuit elements that facilitates a communicative coupling. The storage device 108-A may be a suitable data storage element of any type, format, and configuration, including non-volatile memory such as flash memory and/or read-only memory (ROM), volatile memory such as CPU cache memory and/or random-access memory (RAM), and/or other suitable devices to enable information storage.

The testing element 108 may include or couple to the storage device 108-A to store and/or retrieve information, including a set of settings at which the device 100 operates. In several examples of the present disclosure, the testing element 108 stores to the storage device 108-A each optical data signal 116 that the device 100 produces together with the corresponding set of settings at which the device operated. Similarly, the testing element 108 may also store each change to the set of settings of the device 100. The set of settings may be stored as a known-good set when the optical transmitter device 100 meets the performance threshold when operating at the set. In several examples of the present disclosure, when the optical transmitter device 100 fails to meet the performance threshold and the device 100 exceeds an operating limit, the testing element 108 retrieves a known-good set from the storage device 108-A before the device 100 continues with operation at the known-good set. The testing element 108 may store measurements made during operation of the device 100.

Figure 3A:
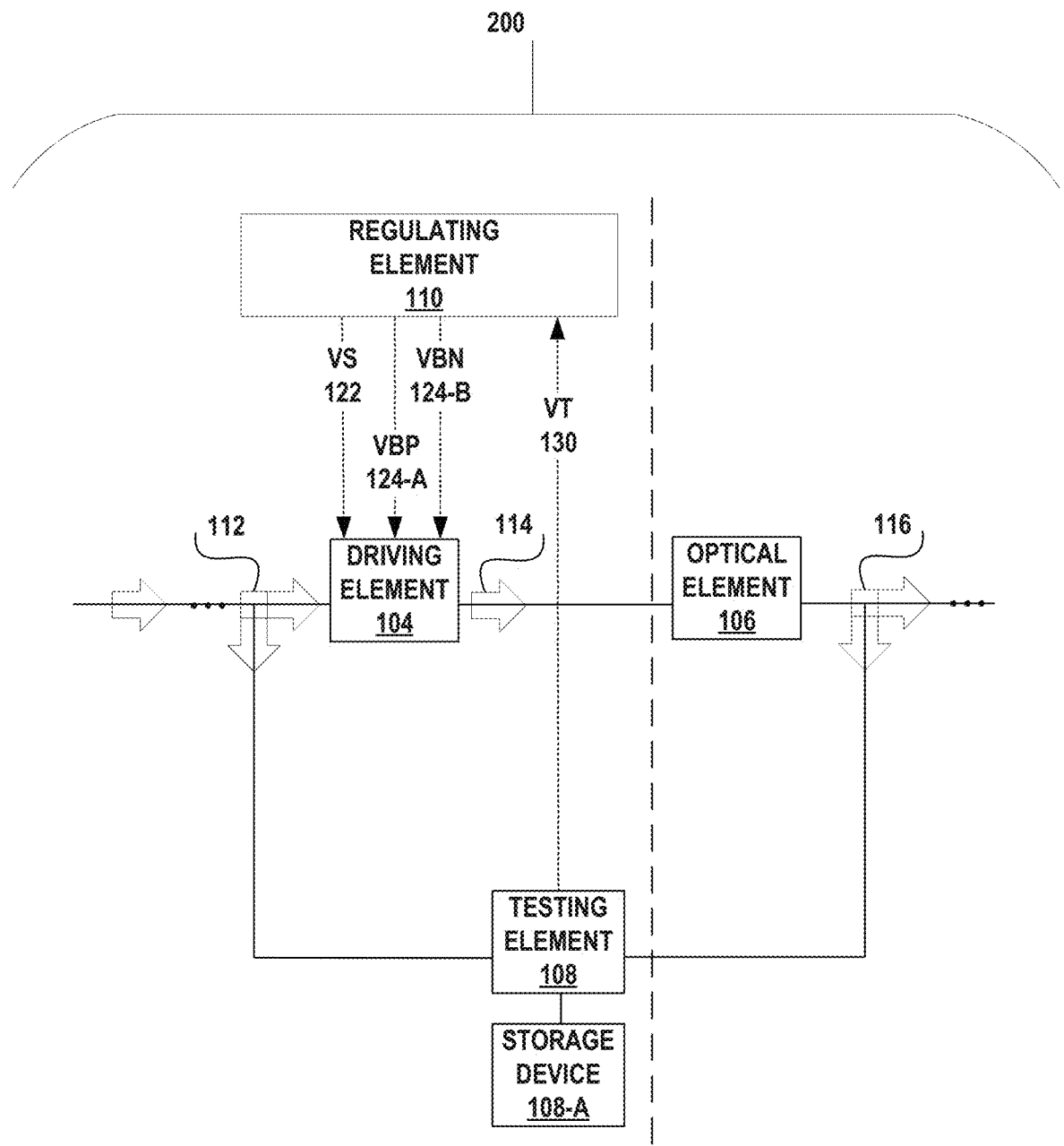
FIGS. 3A-3C are block diagrams of the optical transmitter device of FIG. 2, illustrating additional features according to some examples of the present disclosure.
Figure 3B:
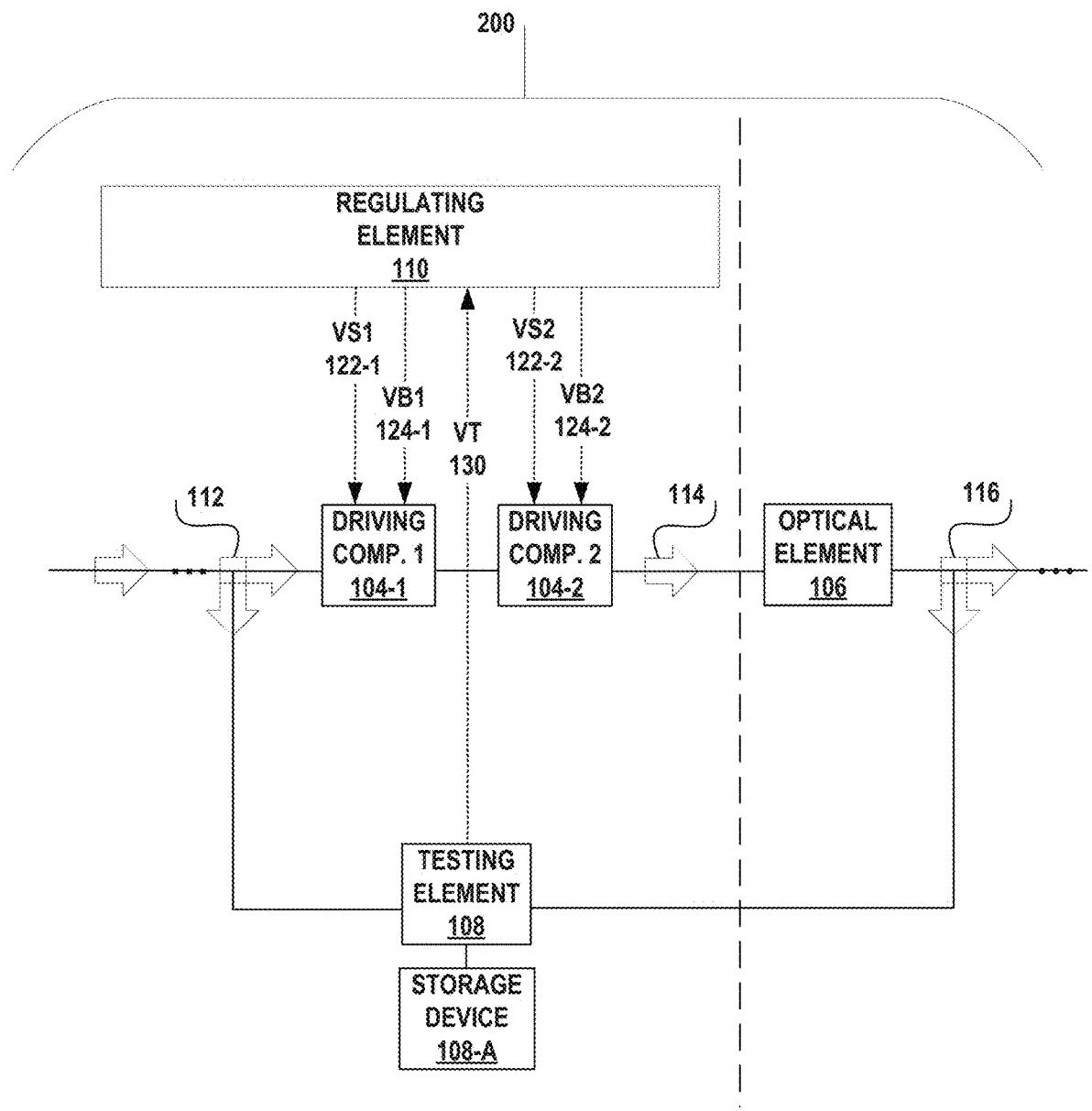
Figure 3C:
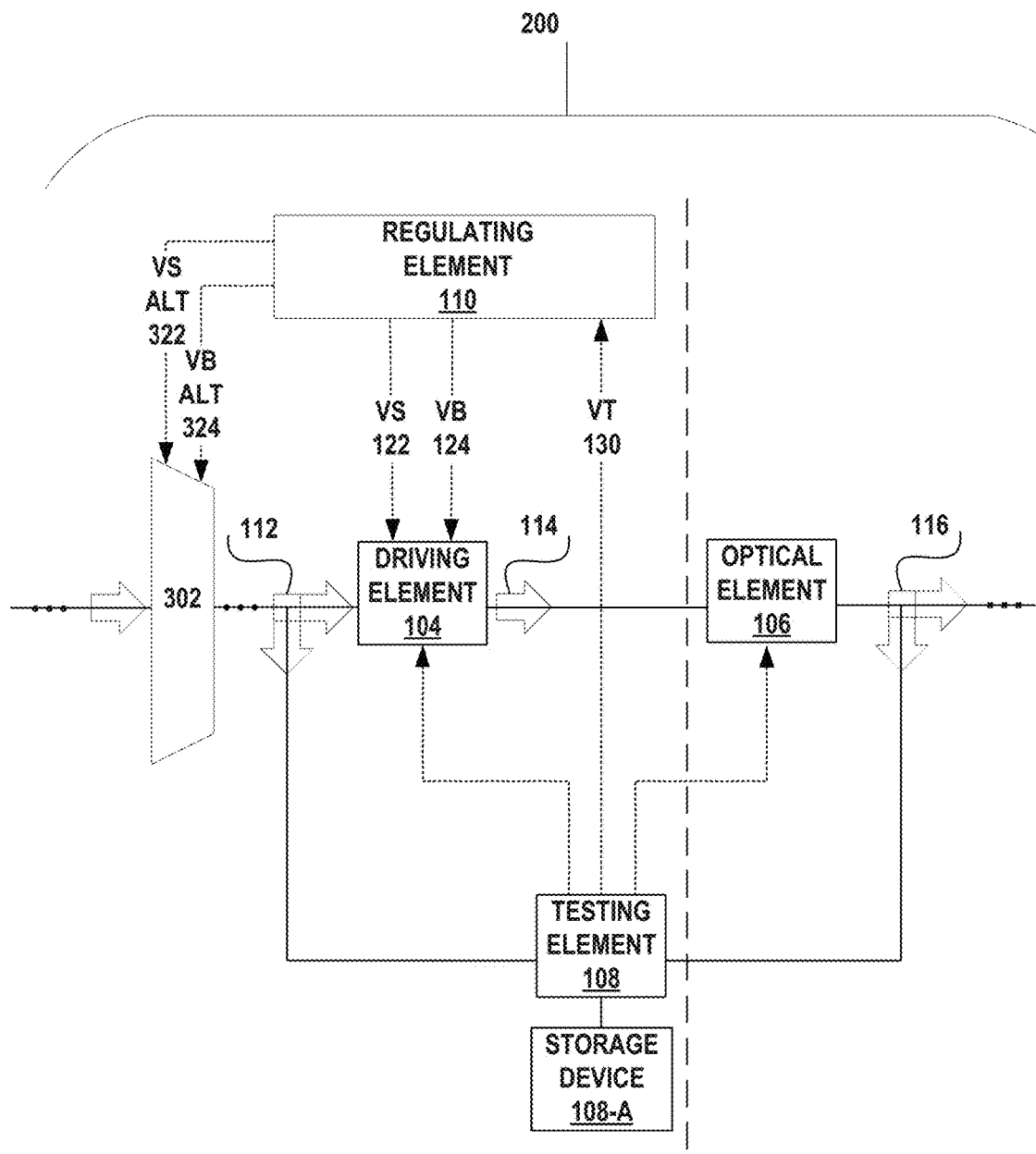

Further examples of the present disclosure are discussed with reference to FIGS. 3A-3C. In that regard, FIGS. 3A-3C are block body diagrams of the optical transmitter device 100 of FIG. 2, illustrating additional features according to various examples of the present disclosure. The additional features illustrated in FIGS. 3A-3C may be combined in the optical transmitter device 100 in any permutation thereof, including omission or addition. In detail, FIG. 3A illustrates the optical transmitter device 100 of FIG. 2, wherein the body bias voltage 124 of FIG. 2 includes a p-type or positive body bias voltage (VPB) 124-A and an n-type or negative body bias voltage (VPN) 124-B; FIG. 3B illustrates the optical transmitter device 100 of FIG. 2, wherein the driving element 104 of FIG. 2 includes a first driving component 104-1 and a second driving component 104-2; and FIG. 3C illustrates the optical transmitter device 100 of FIG. 2, wherein the regulating element 110 regulates a supply voltage 322 and/or a body bias voltage 324 of a circuit element 302 that is independent of the driving element 104, and/or wherein the testing element 108 controls settings of the optical transmitter device 100 independently the regulating element 110 and/or independent of the driving element 104.

With reference to FIG. 3A, the body bias voltage 124 of the driving element 104 may include a p-type or positive body bias voltage (VBP) 124-A and an n-type or negative body bias voltage (VPN) 124-B. As discussed with reference to FIG. 1 above, the positive body bias voltage 124-A may be independent of the negative body bias voltage 124-B of the driving element 104 and/or of other voltages of the device 100. Similarly, the regulating element 110 may cause a magnitude of the positive body bias voltage 124-A to increase and/or to decrease independently of the negative body bias voltage 124-B of the driving element 104, and/or it may cause a magnitude of the negative body bias voltage 124-B to increase and/or to decrease independently of the positive body bias voltage 124-A of the driving element 104. In various examples of the present disclosure, the driving element 104 includes a CMOS circuit with a p-type or positive body bias voltage (VBP) 124-A that corresponds to a PMOS and an n-type or negative body bias voltage (VBN) 124-B that corresponds to a NMOS, such that the regulating element 110 may regulate either or both of the PMOS and the NMOS of the CMOS circuit in this manner.

With reference to FIG. 3B, the driving element 104 may include a plurality of suitable driving components, each of which may operate at a supply voltage and/or a body bias voltage independently of each other and/or of other elements of the device 100. As discussed with respect to the driving element 104 in FIG. 1, suitable driving components may include amplifiers, filters, equalizers, and/or other suitable forms that shape an input electrical data signal, arranged in any suitable permutation thereof. In several examples of the present disclosure, the driving element 104 includes an amplifier as a first driving component 104-1 that operates at a supply voltage 122-1 and a body bias voltage 124-1 and a finite-impulse-response (FIR) filter or a feed-forward equalizer (FEE) as a second driving component 104-2 that operates at a supply voltage 122-2 and a body bias voltage 124-2, arranged such that the first electrical data signal 112 passes from the first driving component 104-1 to the second driving component 104-2. Similarly, the regulating element 110 may cause a magnitude of the supply voltage 122-1 and/or a magnitude of the body bias voltage 124-1 of the first driving component 104-1 to change independently of the supply voltage 122-2 and/or the body bias voltage 124-2 of the second driving component 104-2, and/or it may cause a magnitude of the supply voltage 122-2 to and/or a magnitude of the body bias voltage 124-2 of the second driving component 104-2 to change independently of the supply voltage 122-1 and/or the body bias voltage 124-1 of the first driving component 104-1.

With reference to FIG. 3C, the regulating element 110 may cause a reduction in a supply voltage 322 and/or cause an increase in a body bias voltage 324 of a circuit element 302 of the device 100 independently of the supply voltage 122 and the body bias voltage 124 of the driving element 104. In several examples of the present disclosure, the driving element 104 receives the first electrical data signal 112 from a circuit element 302, such as a multiplexing element, that operates at a supply voltage 322 and a body bias voltage 324 independently of the driving element 104. The regulating element may regulate the circuit element 302 in substantially the same manner as it regulates the driving element 104.

Similarly, the testing element 108 may control or vary settings of the device 100 independently of the regulating element 110. The settings may be independent of the driving element 104. In several examples of the present disclosure, the testing element 108 controls a setting of the driving element 104 directly and/or it controls a setting of the optical element 108 directly, without instruction to the regulating element 110 or to any other element. While illustrating control with direct lines in FIG. 3C, the testing element 108 may control settings of the device 100 with any suitable pathway that facilitates such control.

Figure 4:
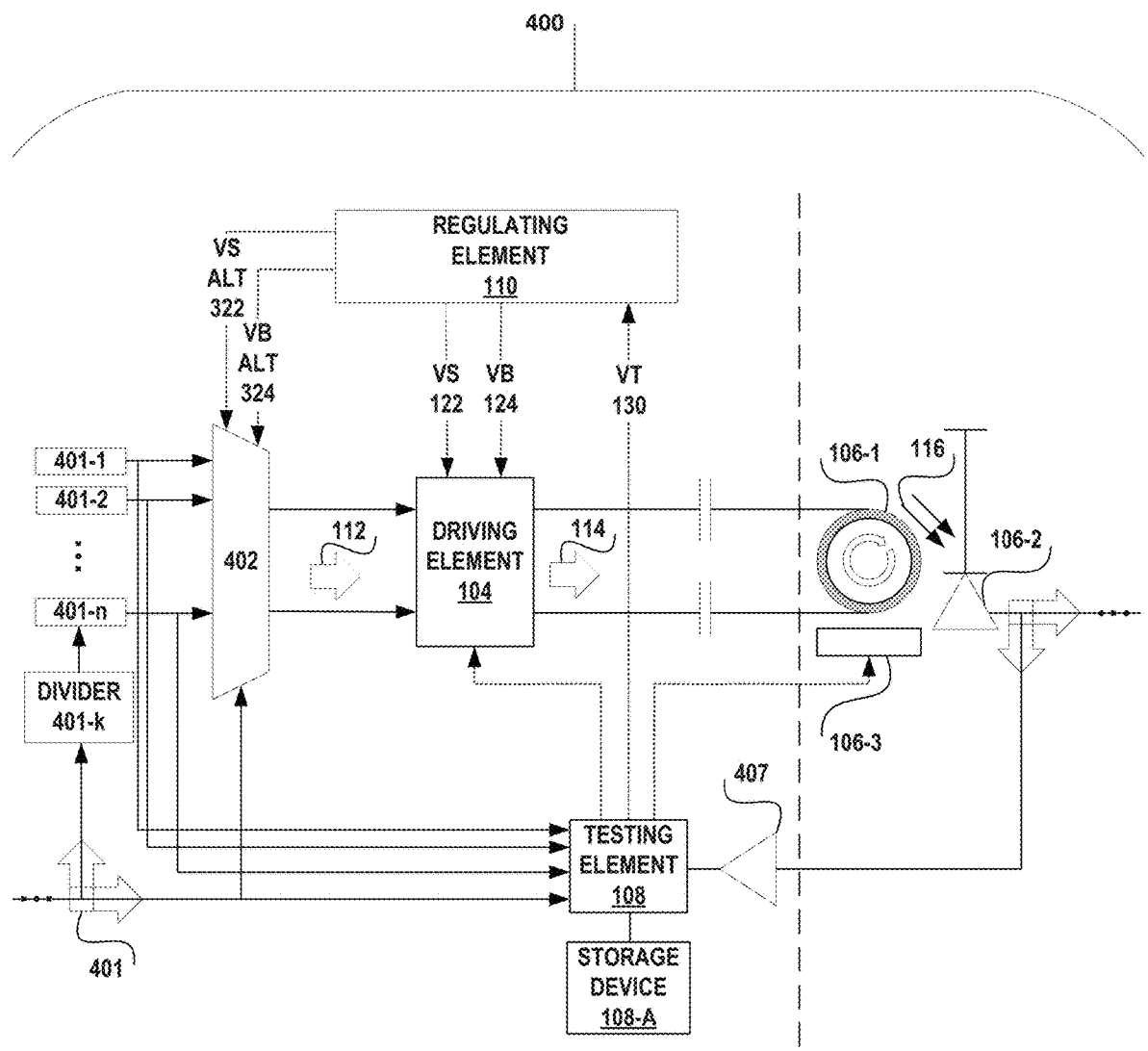
FIG. 4 is a block diagram of the optical transmitter device of FIG. 1, including additional features according to some examples of the present disclosure.

Further examples of the present disclosure are discussed with reference to FIG. 4. In that regard, FIG. 4 is a block body diagram of the optical transmitter device 100 of FIG. 1, including additional features according to various examples of the present disclosure. The additional features illustrated in FIG. 4 may be combined in the optical transmitter device 100 in any permutation thereof, including omission or addition. In detail, FIG. 4 illustrates the optical transmitter device 400, wherein the first electrical data signal 112 includes a set of n data streams 401-1 through 401-n that are divided by a divider 401-k from an input electrical data signal 401; wherein the optical element 106 of FIG. 1 includes a microring modulator 106-1, a heating element 106-2, and/or a photodetector 106-3; and/or wherein the testing element 108 receives the optical data signal 116 from the optical element 106 of FIG. 1 after it has been modified, for example by use of another circuit element 407.

Multiplexing element 402 illustrates a suitable element of any size, shape, and configuration that may receive and process a set of n data streams 401-1 through 401-n of an input electrical data signal 401 to provide the first electrical data signal 112 to the driving element 104. In several examples of the present disclosure, an input electrical data signal 401 is divided by a divider 401-k into a set of n data streams 401-1 through 401-n before being received by the multiplexing element 402 of the optical transmitter device 400, and the multiplexing element 402 provides the first electrical signal 112 to the driving element 104 by multiplexing the set of n data streams of the input electrical signal 401 into one of two output lines, a high-voltage line and a low-voltage line. The input data signal 401 and/or each data stream 401-1 through 401-n of the set of n data streams may also run to the testing element 108. The testing element 108 may store each of these data streams at the storage device 108-A.

The optical element 106 of FIG. 1 may include a microring modulator 106-1, a heater 106-2, and/or a photodetector 106-3. The microring modulator 106-1 may be a suitable racetrack of any shape, size, and material to propagate a signal within a closed loop, including a circular waveguide. The microring modulator 106-1 may exhibit a resonance at a resonant wavelength. The microring modulator 106-1 may be positioned sufficiently near a nearby waveguide such that a signal propagating in the microring modulator 106-1 may couple to the nearby waveguide under certain conditions. The microring modulator 106-1 may thereby output the optical data signal 116. A signal propagating at a resonant wavelength in the microring modulator 106-1 may develop an evanescent wave in the nearby waveguide by optical coupling, more generally referred to as evanescent wave coupling. In contrast, a signal propagating at a non-resonant wavelength in the microring modulator 106-1 may continue to propagate unimpeded in the microring modulator 106-1, without an optical coupling. The microring modulator 106-1 may thus operate with a passband centering on a central frequency. The central frequency of the passband may be the resonant wavelength.

The microring modulator 106-1 may therefore operate as a notch filter, by allowing data signals outside of the passband to continue to propagate unimpeded in the microring modulator 106-1, while data signals inside of the passband couple out of the microring modulator 106-1 and into the waveguide nearby. Such operation of the microring modulator 106-1 as a notch filter may be characterized by a signal transfer function. The optical element 106 of FIG. 1 with the microring modulator 106-1 may operate in a voltage domain separate from that of the other elements of the optical transmitter device 100. For example, FIG. 4 illustrates use of isolating capacitors between the two circuit elements of the driving element 104 and the microring modulator 106-1, enabling separate voltage domains.

The resonant wavelength of the microring modulator 106-1 may be tuned by changing an effective refractive index of the microring modulator 106-1. Changing the temperature of a portion of the microring modulator 106-1 may result in such changing of the effective refractive index. Similarly, the central frequency and passband width for the notch filter may be tuned by changing the resonant wavelength of the microring modulator 106-1.

Heater 106-2 illustrates a suitable element of any shape, size, and material to heat a portion of the microring modulator 106-1 and/or to facilitate changing of the resonant wavelength, the central frequency, and/or the passband width of the notch filter. In several examples of the present disclosure, the heater 106-2 applies heat to a portion of the microring modulator 106-1 to select the wavelengths of the optical data signal 116 that the microring modulator 106-1 outputs by optical coupling to the nearby waveguide. Settings of the heater 106-2 may operate subject to a control process. In several examples of the present disclosure, the testing element 108 controls settings of the heater 106-2 to tune the resonant wavelength of the microring modulator 106-1 to match the wavelengths of the set of n data streams of the input electrical signal 401 that the multiplexing element 402 has received and from which the multiplexing element 402 provides the first electrical signal 112 to the driving element 104.

Photodetector 106-3 illustrates a suitable element of any shape, size, and material to detect the optical data signal 116 and to convert it to an electrical data signal. In several examples of the present disclosure, the testing element 108 receives the optical data signal 116 after the photodetector 106-3 converts it to an electrical data signal. Similarly, the optical data signal 116 and/or its corresponding electrical data signal may be modified by a suitable circuit element 107 of any shape, size, and material before the testing element 108 receives it. In various examples of the present disclosure, a transimpedance amplifier (TIA) processes and/or boosts the electrical data signal before the testing element 108 receives it.

The testing element 108 may buffer and/or reorganize the set of n data streams of the input electrical signal 401 that it receives, such as by use of the storage device 108-A. Similarly, the testing element 108 may buffer and/or reorganize a series of optical data signals 116 that it receives, so as to match each to the data streams of the input electrical signal 401. In several examples of the present disclosure, the testing element 108 matches the wavelength of the optical data signal 116 that it receives as a converted electrical data signal before it compares the optical data signal 116 to the relevant portion of the input electrical signal 401 that matches that wavelength to determine whether the device meets a performance threshold.

Figure 5:
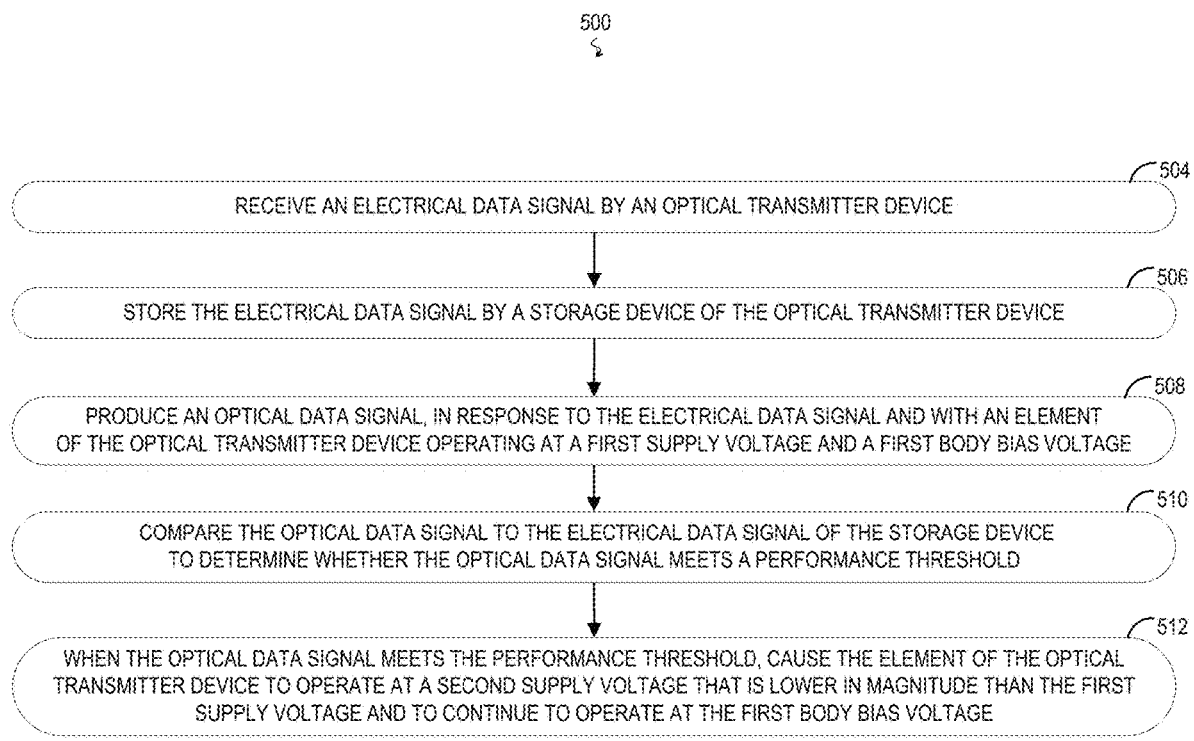
FIG. 5 is a flow diagram of a method for reducing a supply voltage of an optical transmitter device, according to some examples of the present disclosure.

Examples of the method for reducing a supply voltage of an optical transmitter device are illustrated with reference to FIG. 5. In that regard, FIG. 5 is a flow diagram of a method 500 for reducing a supply voltage 122 of an optical transmitter device, according to some examples of the present disclosure. It is understood that the description of method 500 is non-limiting, and steps may be added to and omitted from the method 500 without departing from the disclosure. Unless noted otherwise, processes of the method 500 may be performed in any order including concurrently by one or more elements of the optical transmitter device 100. In general, the method 500 is equally suitable for use with the optical transmitter device 100 of FIG. 1, the optical transmitter device 200 of FIG. 2 and/or FIGS. 3A-3C, the optical transmitter device 400 of FIG. 4, and/or any other suitable circuit and/or device to receive an electrical data signal and to produce in response an optical data signal.

In block 504, the optical transmitter device receives an electrical data signal. For an example referencing FIG. 1 and/or FIG. 2, the optical transmitter device 100 and/or 200 receives the first electrical data signal 112 at the driving element 104. In some examples referencing FIG. 4, the optical transmitter device 400 receives a set of n data streams 401-1 through 401-n that are divided from an input electrical signal 401.

In block 506, the optical transmitter device stores the electrical data signal by a storage device. For an example referencing FIG. 1, the testing element 108 may store the electrical data signal in a storage device that it includes, such as in a buffer memory. For an example referencing FIG. 2 and/or FIG. 4, the testing element 108 may communicate with the storage device 108-A to store each data stream 401-1 through 401-n of the set of the input electrical signal 401 that it receives, and/or the input electrical signal 401 that it receives.

In block 508, the optical transmitter device produces an optical data signal in response to the electrical data signal, with an element of the optical transmitter device operating at a first supply voltage and a first body bias voltage. In some examples referencing FIG. 1 and/or FIG. 2, the optical transmitter device 100 and/or 200 may produce the optical data signal 116 in response to the first electrical signal 112. In some examples referencing FIG. 4, the optical transmitter device 400 may produce the optical data signal 116 in response to the set of n data streams 401-1 through 401-n that are divided from the input electrical signal 401 and that are received by the multiplexing element 402 operating at the supply voltage 322 and the body bias voltage 324. The optical transmitter device may initialize its operation at initial and/or default settings of supply voltage and body bias voltage. In several examples of the present disclosure, initial and/or default settings are based on a manufacturer or prior testing of operation of the optical transmitter device to meet a performance threshold.

In some examples referencing FIG. 4, each data stream 401-1, 401-2, etc. of the set of n data streams 401-1 through 401-n may correspond to an optical data signal 116, such that the optical transmitter device 400 may perform the method 500 n times. In some examples, the optical data signal 116 of FIG. 4 may be understood to include each data stream of the set of n data streams, which may be output by the optical element 106 in any sequence.

In block 510, the optical transmitter device compares the optical data signal to the electrical data signal to determine whether the optical data signal meets a performance threshold. In several examples of the present disclosure, the testing element 108 compares the optical data signal 116 that it receives from the optical element 106 to the first electrical data signal received by the optical transmitter device. As discussed with reference to FIG. 1 above, the testing element 108 may apply any suitable comparison test, including data rate, bit error rate (BER), and/or extinction ratio (ER). In some examples referencing FIG. 4, when the testing element 108 receives and stores a set of n data streams 401-1 through 401-*n* of an input electrical signal 401, the testing element 108 may first perform wavelength matching of the optical data signal 116 to the n data streams of the set to facilitate comparing the optical data signal 116 to the corresponding portion of the electrical signal 401 that was received by the optical transmitter device 400. The testing element 108 may compare each data stream of the set separately, or it may store the optical data signal 116 as a set of output and then reorganize the output set by wavelength matching to the data streams 401-1 through 401-*n*.

In block 512, the optical transmitter device causes the element of the device, for example as determined in block 508, to operate at a second supply voltage that is lower in magnitude that the first supply voltage and to continue to operate at the first body bias voltage when the optical transmitter device meets the performance threshold, for example as determined in block 510. In some examples with reference to FIG. 1, the regulating element 110 may cause a reduction in the magnitude of the supply voltage 122 of the driving element 104. In some examples with reference to FIG. 2 and/or FIG. 4, the testing element 108 may send an instruction 130 to the regulating element 110 that causes the regulating element 110 to cause the reduction in magnitude of the supply voltage 122 of the driving element 104. The second supply voltage may be a decremental magnitude lower than the first supply voltage, wherein the decremental size is preset and/or determined by the optical transmitter device. In some examples, the device reduces the magnitude of the first supply voltage and varies the magnitude of the first body bias voltage simultaneously, such as increasing the first body bias voltage to a second body bias voltage, before the device continues operation at those settings.

Figure 6:
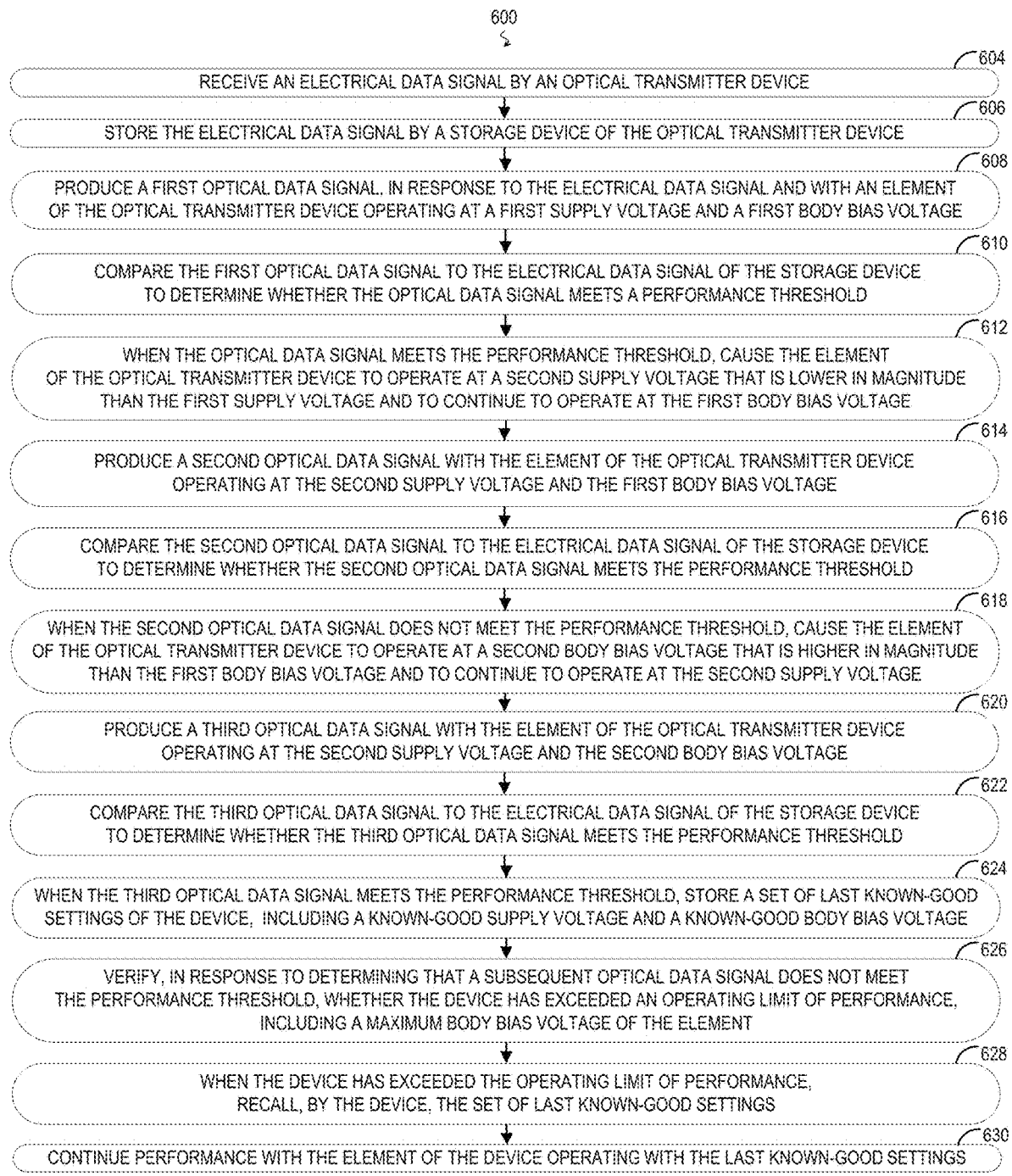
FIG. 6 is a flow diagram of a method for increasing a body bias voltage of an optical transmitter device, according to some examples of the present disclosure.

Further examples are described in detail with reference to FIG. 6. In that regard, FIG. 6 is a flow diagram of a method 600 of increasing a body bias voltage of an optical transmitter device, according to some examples of the present disclosure. As noted with respect to method 500 of FIG. 5, it is understood that the description of method 600 is non-limiting, that steps may be added to and omitted from the method 600 without departing from the disclosure. Unless noted otherwise, processes of the method 600 may be performed in any order including concurrently by one or more elements of the optical transmitter device. In general, the method 600 is equally suitable for use with the optical transmitter device 100 of FIG. 1, the optical transmitter device 200 of FIG. 2 and/or FIGS. 3A-3C, the optical transmitter device 400 of FIG. 4, and/or any other suitable device to receive an electrical signal and to transmit in response an optical signal.

Blocks 604, 606, 608, 610, and 612 of the method 600 may involve processes that are each substantially similar to that of the corresponding blocks 504, 506, 508, 510, and 512, respectively, of the method 500. Referring to block 604, the optical transmitter device receives an electrical data signal. This may be performed substantially as described in block 504 of FIG. 5. Referring to block 606, a storage device of the optical transmitter device stores the electrical data signal. This may be performed substantially as described in block 506 of FIG. 5. Referring to block 608, the optical transmitter device produces a first optical data signal in response to the electrical data signal and with an element of the optical transmitter device operating at a first supply voltage and a first body bias voltage. This may be performed substantially as described in block 508 of FIG. 5. Referring to block 610, the optical transmitter device compares the first optical data signal to the electrical data signal of the storage device to determine whether the first optical data signal meets a performance threshold. This may be performed substantially as described in block 510 of FIG. 5. Referring to block 612, the optical transmitter device causes the element of the device, for example as determined in block 608, to operate at a second supply voltage that is lower in magnitude that the first supply voltage and to continue to operate at the first body bias voltage when the optical transmitter device meets the performance threshold, for example as determined in block 610. This may be performed substantially as in block 512 of FIG. 5.

In block 614, the optical transmitter device produces a second optical data signal, with the element of the optical transmitter device operating at the second supply voltage, for example as determined in block 612, and the first body bias voltage. The second optical data signal may also be based on the electrical data signal of block 604, or it may be based on a new electrical data signal analogous to the electrical data signal of block 604 that is received by the device in substantially the same manner as described with respect to the electrical data signal of block 604. The device may produce the second optical data signal in substantially the manner as described with respect to the first optical data signal in block 610.

In block 616, the optical transmitter device compares the second optical data signal to the electrical data signal of the storage device to determine whether the second optical data signal meets the performance threshold. This may be performed substantially as described with respect to the first optical data signal in block 610.

In block 618, the optical transmitter device causes the element of the device, for example as determined in block 608, to operate at a second body bias voltage that is higher in magnitude than the first body bias voltage and to continue to operate at the second supply voltage when the optical transmitter device does not meet the performance threshold, for example as determined in block 616. This may be performed substantially in a manner analogous to that described with respect to reducing the supply voltage in block 612, or it may be performed in a distinct manner such as direct instruction to the element of the device.

In block 620, the optical transmitter device produces a third optical data signal, with the element of the optical transmitter device operating at the second supply voltage, for example as determined in block 612, and the second body bias voltage, for example as determined in block 618. The optical transmitter device may produce the third optical data signal in substantially the manner as described with respect to the second optical data signal in block 614 and/or with respect to the first optical data signal in block 608.

In block 622, the optical transmitter device compares the third optical data signal to the electrical data signal of the storage device to determine whether the third optical data signal meets the performance threshold. This may be performed substantially as described with respect to the second optical data signal in block 616 and/or with respect to the first optical data signal in block 610.

In block 624, the optical transmitter device stores a set of last known-good settings of the device, including a known-good supply voltage and a known-good body bias voltage, when the third optical data signal meets a performance threshold, for example as determined in block 622. This may be performed substantially in a manner analogous to that described with respect to storing the electrical data signal of block 606. The set of last known-good settings may include settings of the device that are independent of the voltage settings.

In block 626, the optical transmitter device verifies in response to determining that a subsequent optical data signal does not meet the performance threshold, whether the device has exceeded an operating limit of performance, including a maximum body bias voltage of the element. The operating limit may be preset and/or determined by the device in a manner analogous to determining whether the device meets the performance threshold in block 610, 616, and/or 622. With reference to FIG. 1, FIG. 2, and/or FIG. 4, the testing element 108 may verify the operating limit of the device. In some examples of the present disclosure, the testing element verifies the operating limit independently by measurement. For example, the testing element may measure leakage current at an element of the device.

In block 628, the optical transmitter device recalls the set of last known-good settings, for examples as stored in block 624, when the device has exceeded the operating limit of performance, for example as determined in block 626. With reference to FIG. 1, the testing element 108 may recall the set of last-known good settings from a storage device that it includes, such as a buffer memory. With reference to FIG. 2 and/or FIG. 4, the testing element 108 may recall the set of last-known good settings from the storage device 108-A.

In block 630, the optical transmitter device continues performance with the element of the device 100 operating with the last known-good settings. The device may also inactivate the testing element of the device to conserve power and to improve performance. With reference to FIG. 1, FIG. 2, and/or FIG. 4, the testing element 108 may enter a standby mode of minimal power use after the device restores known-good settings, as in block 628.

Figure 7:
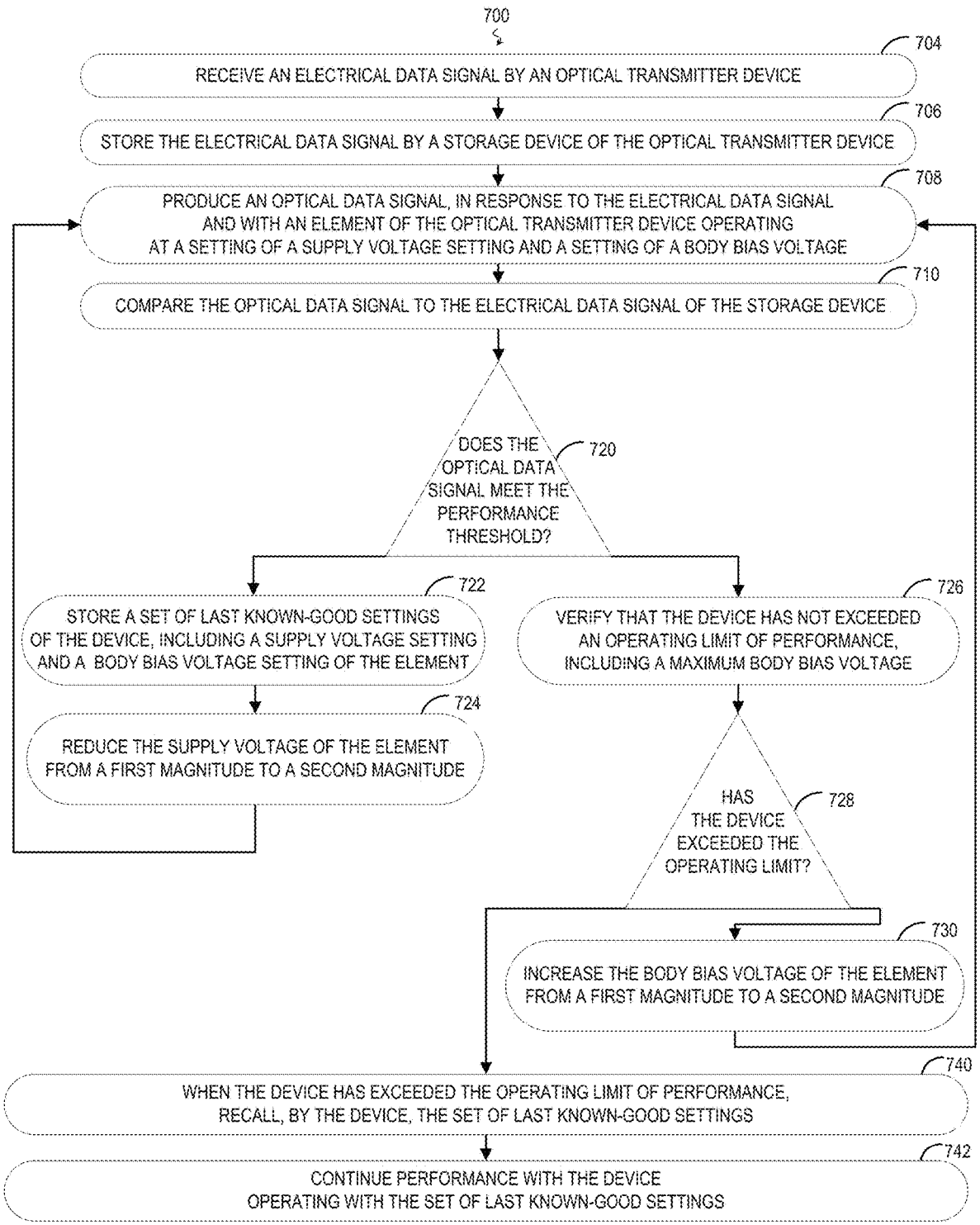
FIG. 7 is a flow diagram of a method for determining a set of last known-good settings, including a setting of a supply voltage and a setting of a body bias voltage of an optical transmitter device, according to some examples of the present disclosure.

Further examples are described in further detail with reference to FIG. 7. In that regard, FIG. 7 is a flow diagram of a method for determining a set of last known-good settings, including a setting of a supply voltage and a setting of a body bias voltage of an optical transmitter device, according to some examples of the present disclosure. As noted with respect to method 500 of FIG. 5 and/or method 600 of FIG. 6, it is understood that the description of method 700 is non-limiting, that steps may be added to and omitted from the method 700 without departing from the disclosure. Unless noted otherwise, processes of the method 700 may be performed in any order including concurrently by one or more elements of the optical transmitter device. In general, the method 700 is equally suitable for use with the optical transmitter device 100 of FIG. 1, the optical transmitter device 200 of FIG. 2 and/or FIGS. 3A-3C, the optical transmitter device 400 of FIG. 4, and/or any other suitable device to receive an electrical signal and to transmit in response an optical signal.

Blocks 704, 706, 708, and 710, of the method 700 may involve processes that are each substantially similar to that of the corresponding blocks 504, 506, 508, and 510, respectively, of the method 500 and/or the corresponding blocks 604, 606, 608, and 610, respectively, of the method 600. Referring to block 704, the optical transmitter device receives an electrical data signal. This may be performed substantially as described in block 504 of FIG. 5 and/or block 604 of FIG. 6. Referring to block 706, a storage device of the optical transmitter device stores the electrical data signal. This may be performed substantially as described in block 506 of FIG. 5 and/or block 606 of FIG. 6. Referring to block 708, the optical transmitter device produces an optical data signal in response to the electrical data signal and with an element of the optical transmitter device operating at a setting of a supply voltage and a setting of a body bias voltage. This may be performed substantially as described in block 508 of FIG. 5 and/or block 608 of FIG. 6. Referring to block 710, the optical transmitter device compares the first optical data signal to the electrical data signal of the storage device. This may be performed substantially as described in block 510 of FIG. 5 and/or block 610 of FIG. 6.

In block 720, the device determines whether to proceed to blocks 722 and 724 or to block 726, on the basis of the determining of whether it meets the performance threshold. When the device meets the performance threshold, it may proceed to blocks 722 and 724. When the device does not meet the performance threshold, it may proceed to block 726. It may make its determination on the basis of comparison as in block 710, and/or in substantially the same manner as described in block 510 of FIG. 5 and/or block 610 of FIG. 6.

In block 722, the device stores a set of last known-good settings of the device, including a supply voltage setting and a body bias voltage setting of the element of the device. This may be performed in a manner analogous to storing the electrical data signal of block 706 and/or in substantially the same manner as the storing of settings in block 624 of FIG. 6.

In block 724, the device reduces the supply voltage of the element from a first magnitude to a second magnitude. This may be performed in substantially the same manner as in block 512 of FIG. 5 and/or block 612 of FIG. 6. As indicated in FIG. 7, the method 700 may return from block 724 to block 708, producing an optical data signal with the element operating at a setting of the reduced supply voltage. The method 700 may continue from block 708, and it may continue returning from block 724 to block 708 until the device may determine that the device does not meet a performance threshold, as in block 720, such that it may then continue from block 720 instead to block 726, rather than returning to block 724.

In block 726, the device verifies whether the device has not exceeded an operating limit of performance, including a maximum body bias voltage. This may be performed in substantially the same manner as in block 626 of FIG. 6.

In block 728, the device determines whether to proceed to block 730 or to block 740, on the basis of the verifying of whether it has not exceeded the operating limit. When the device has not exceeded the operating limit, it may proceed to block 730. When the device has exceeded the operating limit, it may proceed to block 740. It may make its determination on the basis of verification as in block 726, and/or in substantially the same manner as described in block 626 of FIG. 6.

In block 730, the device increases the body bias voltage of the element from a first magnitude to a second magnitude. This may be performed in substantially the same manner as in block 618 of FIG. 6. As indicated in FIG. 7, the method 700 may return from block 730 to block 708, producing an optical data signal with the element operating at a setting of the increased body bias voltage. The method 700 may continue from block 708, and it may continue returning from block 730 to block 708 until the device may determine that the device exceeds an operating limit, as in block 728, such that it may then continue from block 728 instead to block 740, rather than returning to block 730.

Similarly as observed above with respect to block 724, the method 700 may return from block 730 to block 708 and then continue to determine, as in block 720, that it meets the performance threshold such that it continues to blocks 722 and 724, rather than returning to block 726. In this manner, the device may continue to reduce the supply voltage, as in block 724, and to increase the body bias voltage, as in 730, until the device both fails to meet an operating threshold, as in block 720, and exceeds an operating limit, as in block 728. The performance threshold and the operating limit may be either equivalent or distinct. For example, the performance threshold may be based on the optical data signal produced, while the operating limit may be a measurement of the device during operation. In several examples of the present disclosure, the testing element both determines whether the device meets the performance threshold and verifies whether it exceeds the operating limit during operation.

In block 740, the device recalls the set of last known-good settings when the device determines, as in block 728, that the device has exceeded the operating limit. This may be performed in substantially the same manner as in block 628 of FIG. 6.

In block 742, the device continues to operate with the set of last known-good settings. The set of last known-good settings include a known-good setting of the supply voltage and a known-good setting of the body bias voltage of the element of the device. Thus, by performance of the method 700, the optical transmitter device may determine a set of known-good settings at which to operate that reduced the supply voltage of an element of the device from an initial and/or nominal magnitude to a lower magnitude.

Figure 8B:
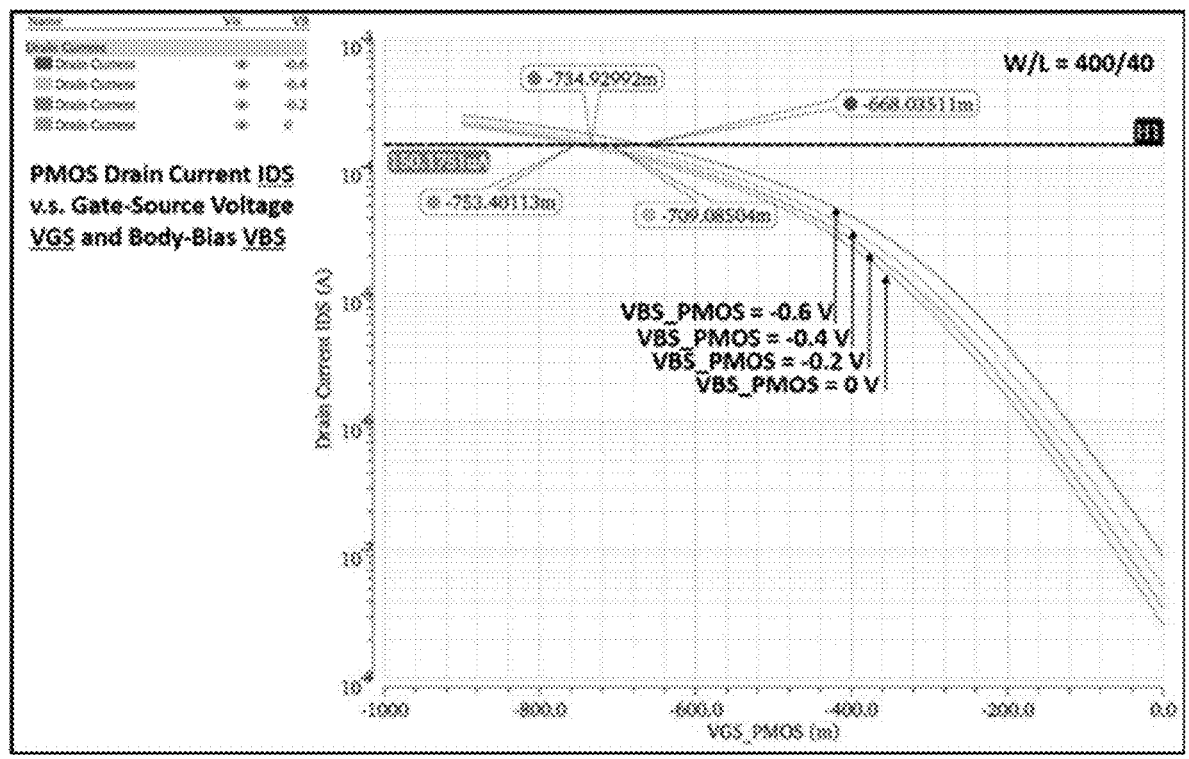
Figure 8C:
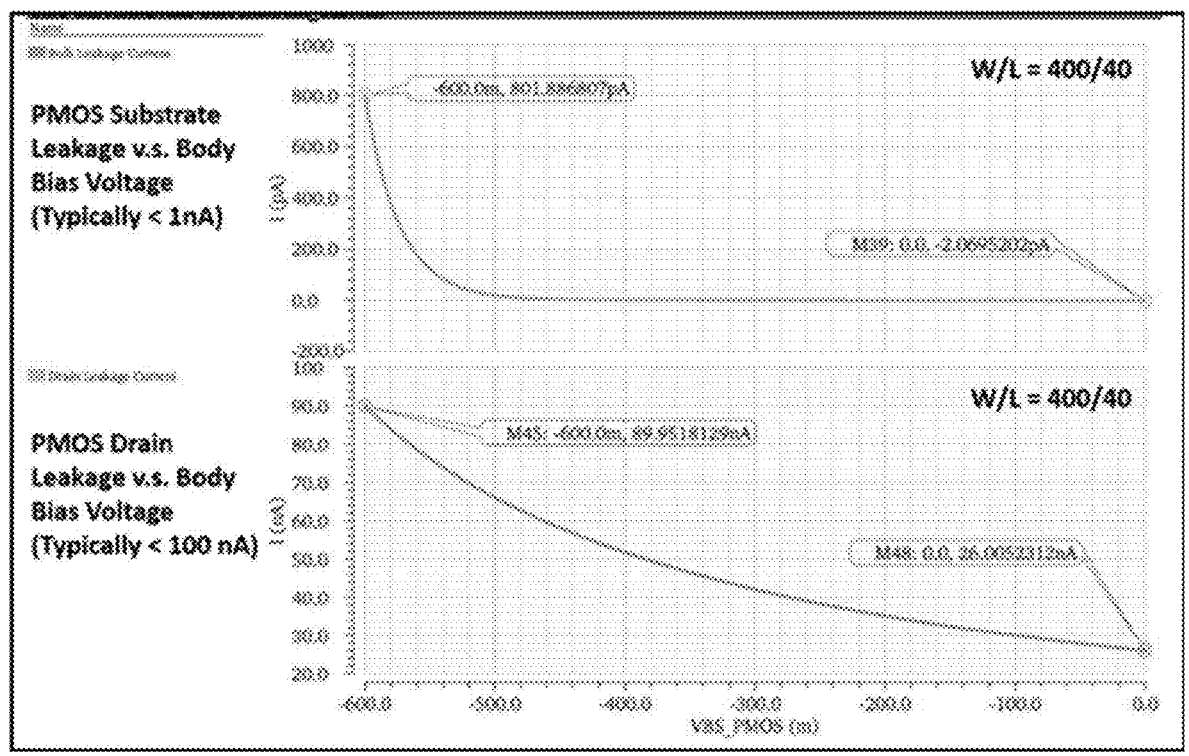

FIGS. 8A-8C are example chart diagrams of the performance of an optical transmitter device performing according to examples of the present disclosure. In that regard, FIG. 8A charts an example eye diagram of an optical transmitter device; FIG. 8B charts an example drain current of an optical transmitter device; and FIG. 8C charts an example leakage current of an optical transmitter device. In general, the example charts of FIGS. 8A-8C are equally suitable for use with the optical transmitter device 100 of FIG. 1, the optical transmitter device 200 of FIG. 2 and/or FIGS. 3A-3C, and/or the optical transmitter device 400 of FIG. 4, and/or in performing the method 500 of FIG. 5, the method 600 of FIG. 6, and/or the method 700 of FIG. 7. In the example charts of FIG. 9A-9C, the optical transmitter device includes a 400-nm wide and 40-nm long PMOS on a CMOS inverter operating at 25 Gb/s. The CMOS inverter may use twin-well CMOS technology. The CMOS inverter may vary the p-type or positive body bias voltage, e.g. the body bias voltage of the PMOS, without varying the n-type or negative body bias voltage, e.g. that of the NMOS.

Referring to FIG. 8A, operation of the optical transmitter device in performing according to examples of the present disclosure may be characterized by an eye diagram. An eye diagram may represent an oscilloscope display in which an electrical data signal is repeatedly sampled to create the vertical input of the eye diagram, whereas the data rate creates the corresponding horizontal sweep of the eye diagram. An eye diagram may indicate a set of information corresponding to the electrical data signal that may facilitate predicting the performance of the optical transmitter device, including errors such as timing variation, jitter, and/or distortion, at a set of operating settings of the device, including a supply voltage, a body bias voltage, and/or an operating frequency. In both the upper chart of FIG. 8A-1 and in the lower chart of FIG. 8A-2, the transient time charted is 50 ns. In FIG. 8A-1, though, the CMOS inverter uses a nominal supply voltage of 0.9V, a positive body bias voltage of 0 V, and a total power consumption of 45 µW. In contrast in the lower chart of FIG. 8A-2, the CMOS inverter uses a reduced supply voltage of 0.6 V, a positive body bias voltage of −0.6V, and a total power consumption of 17 µW. The upper and lower charts of FIG. 8A indicate that performance of the optical transmitter device may remain comparable at the lower supply voltage and/or with a reduction in power use. Thus, the CMOS inverter of the optical transmitter device may save more than 50% of on its power consumption by reducing the magnitude of the supply voltage and increasing the magnitude of the p-type or positive body bias voltage within a range of 0.6 V of body bias voltage.

Referring to FIG. 8B, operation of the optical transmitter device in performing according to examples of the present disclosure may be characterized by plotting the drain current of an element of the device against the supply voltage of the element for different magnitudes of the p-type or positive body bias voltage of the element. As discussed in with respect to FIG. 1, the drain current $I_{DS}$ affects the operation speed $V_C$ of the CMOS inverter and tends to decrease with decreasing supply voltage. However, the plots of FIG. 8B indicate that increase in the body bias voltage may offset the impact of a reduction in the supply voltage, such that the drain current remains at substantially the same level and thereby maintains the operation speed of the CMOS inverter at the reduced supply voltage. For example, comparing the lowermost curve to the topmost curve of FIG. 8B indicates that the drain current at an initial or nominal supply voltage of −0.753 V with a body bias voltage of 0 V (lowermost curve) remains at substantially the same level at a reduced supply voltage of −0.668 V with a body bias voltage of −0.6 V (topmost curve). Further based on equation (1), operation by the optical transmitter device at the latter voltages may save 21% of the dynamic power P consumed by the CMOS inverter in operation, without compromising performance.

Referring to FIG. 8C, operation of the optical transmitter device in performing according to examples of the present disclosure may be characterized by plotting the leakage current of an element of the device against the body bias voltage of the element. The leakage current may occur either at the substrate or at the drain of the element. The top chart of FIG. 8C shows that leakage current at the substrate of the PMOS may remain at less than 1 nA up to a magnitude of −0.6V of body bias voltage. Similarly, the bottom chart of FIG. 8C shows that the leakage current at the drain of the PMOS may remain at less than 100 nA up to a magnitude of −0.6 of body bias voltage. Thus in a high-speed circuit, the top and bottom charts of FIG. 8C indicate that leakage current and thus the power loss by leakage may remain comparably negligible during operation of the device within a range of the body bias voltage.

Figure 9:
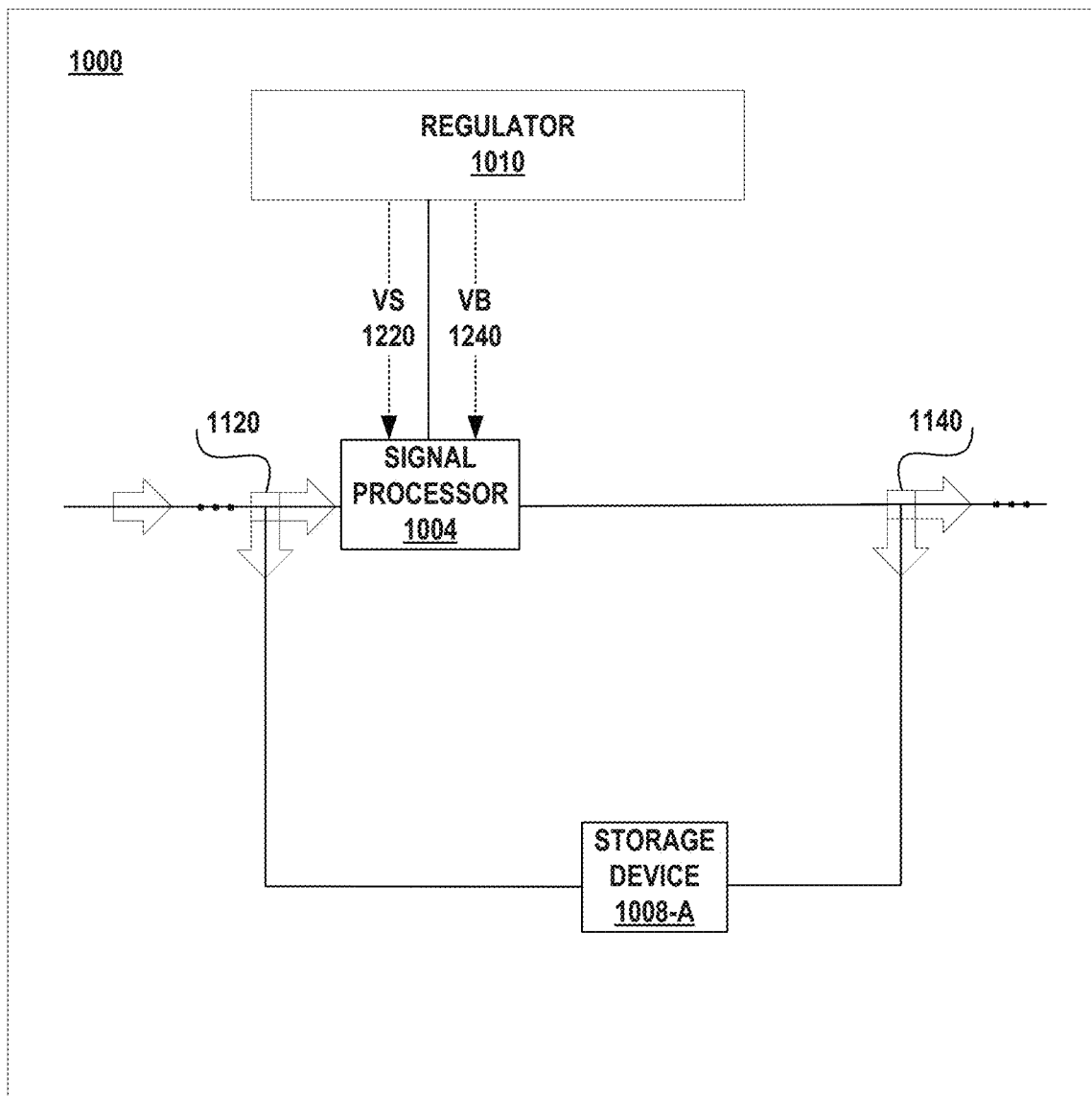
FIG. 9 is a block diagram of an integrated circuit, according to some examples of the present disclosure.

Further examples are described with respect to an integrated circuit suitable for use in performing according to examples of the present disclosure. In that regard, FIG. 9 is a block diagram of an integrated circuit 1000, according to some examples of the present disclosure. The integrated circuit 1000 is suitable for use in the optical transmitter device of the examples of FIGS. 1, 2, 3A-3C, 4; and/or in performing several of the processes of method 500 of FIG. 5, method 600 of FIG. 6, and/or method 700 of FIG. 7. The integrated circuit 1000 may operate with any combination of hard-coded and programmable logic and/or elements. The integrated circuit 1000 may include the illustrated elements of FIGS. 1, 2, 3A-3C, and/or 4 in any form or combination, including omission or addition. The integrated circuit 1000 may include signal processor 1004, storage device 1008-A, and regulator 1010.

Signal processor 1004 illustrates a suitable element of any size, shape, and configuration to receive an input signal 1120 and to process the input signal 1120 to produce an output signal 1140. The input signal 1120 and/or the output signal 1140 may run both to the signal processor 1004 as well as to the storage device 1008-A, as illustrated by FIG. 9. The signal processor 1004 may operate with a set of settings, including a supply voltage (VS) 1120 and a body bias voltage (VB) 1240. While illustrated as a single entity, the signal processor 1004 may include a single circuit element, a plurality of discrete circuit elements, or any permutation thereof. When the signal processor 1004 includes a plurality of circuit elements, each circuit element of the plurality may receive an input electrical signal, may output a shaped electrical signal, and/or may operate at a supply voltage that is independent of the supply voltages of any and/or all other circuit elements. The signal processor 1004 may be substantially the same as the driving element 104 of FIGS. 1, 2, 3A-3C, and/or 4.

Storage device 1008-A illustrates a suitable element of any size, shape, format, and configuration that may store the input signal 1120 and the output signal 1140. The storage device 1008-A may store the signals when the circuit 1000 meets a performance threshold. The storage device 1008-A may store other suitable settings of the integrated circuit 1000, including a setting of the supply voltage 1220 and a setting of the body bias voltage 1240 at which the signal processor 1004 of the circuit 1000 operated to produce the output signal 1140. While illustrated with a direct line in FIG. 2, the storage device 1008-A may receive the input signal 1120 and the output signal 1140 along any suitable pathway of circuit elements that facilitates a communicative coupling. The storage device 1008-A may be a suitable data storage element of any type, format, and configuration, including non-volatile memory such as flash memory and/or read-only memory (ROM), volatile memory such as CPU cache memory and/or random-access memory (RAM), and/or other suitable devices to enable information storage. The storage device 1008-A may be substantially the same as the storage device 108-A of FIGS. 2, 3A-3C, and/or 4.

Regulator 1010 illustrates a suitable element of any size, shape, and configuration that may vary a magnitude of the supply voltage 1220 and a magnitude of the body bias voltage 1240 of the signal processor 1004. The regulator 1010 may reduce the supply voltage 1220 when the circuit 1000 does not meet the performance threshold, whereas it may increase the body bias voltage 1240 when the circuit 1000 meets the performance threshold. The regulator 1010 may vary the voltages by either a preset and/or determined increment and/or decrement. While illustrated as a single entity, the regulator 1010 may include a single circuit element, a plurality of discrete circuit elements, or any permutation thereof. When the regulator 1010 includes a plurality of circuit elements, each circuit element of the plurality may couple to other circuit elements independently and may operate at a supply voltage that is independent of the other circuit elements. When the signal processor 1004 includes a plurality of components each operating at a supply voltage, the regulator 1010 may be able to reduce a magnitude of the supply voltage of each component of the plurality independently of the other supply voltages. The regulator 1010 may vary the magnitude of the supply voltage 1220 and/or the magnitude of the body bias voltage 1240 of the signal processor 1004 by any suitable control method. While illustrated with a direct line in FIG. 9, the regulator 1010 may cause a reduction in the magnitude of the supply voltage 1220 and/or an increase in the magnitude of the body bias voltage 1240 of the signal processor 1004 via other circuit elements to modify or otherwise to transmit to the signal processor 1004 an operation directly controlled by the regulator 1010. The regulator may be substantially the same as the regulating element of FIGS. 1, 2, 3A-3C, and/or 4.

Figure 10:
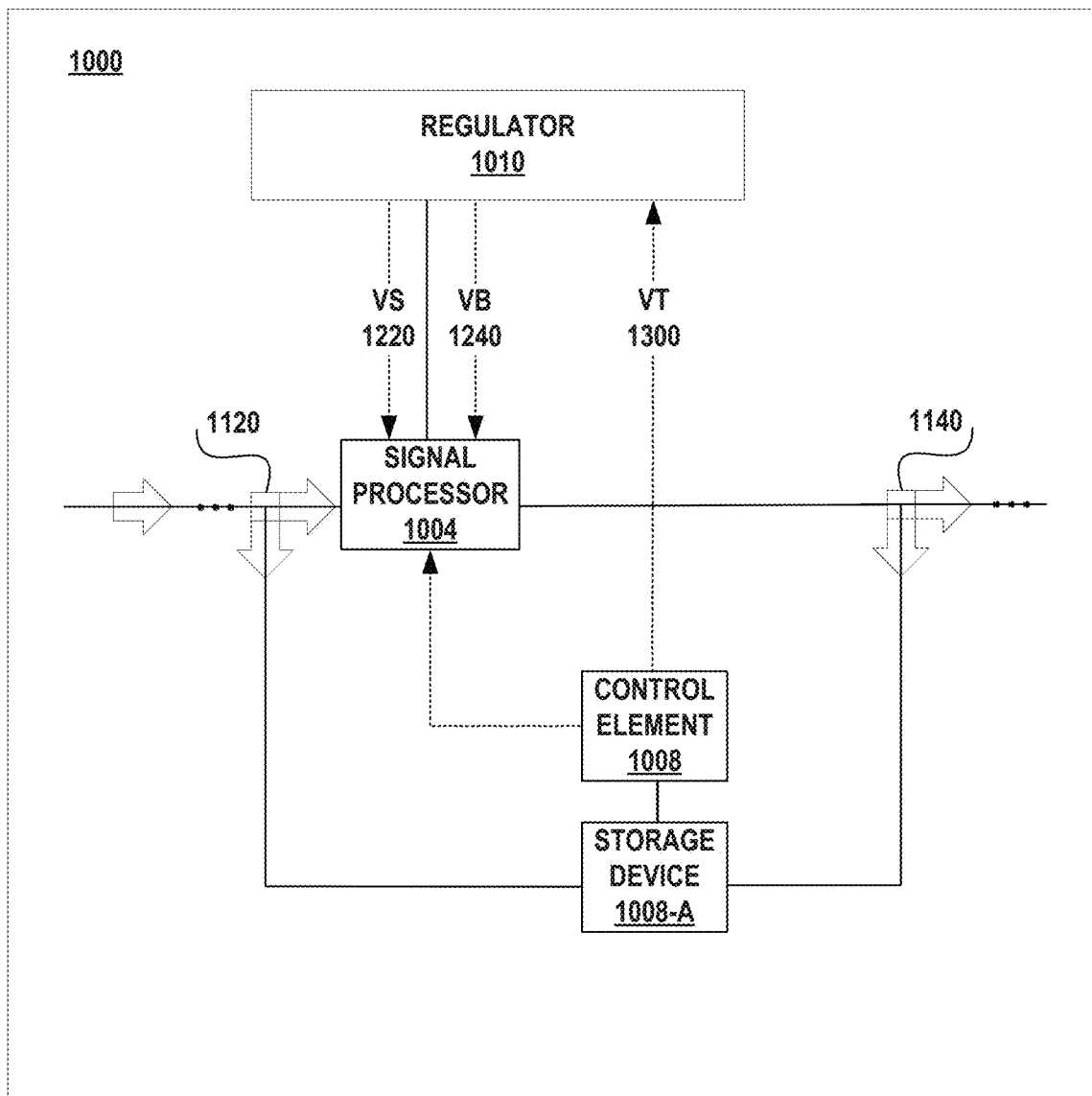
FIG. 10 is a block diagram of the integrated circuit of FIG. 9, illustrating additional features according to some examples of the present disclosure.

Examples of an integrated circuit suitable for use in performing according to the present disclosure are described in further detail in the context of FIG. 10. In that regard, FIG. 10 is a block diagram of the integrated circuit 1000 of FIG. 9, illustrating additional features according to some examples of the present disclosure. In detail, FIG. 10 illustrates the integrated circuit 1000, wherein the circuit 1000 includes control element 1008, and wherein the control element 1008 is communicatively coupled with the signal processor 1004, the storage device 1008-A, and/or the regulator 1010. As with FIG. 9, the integrated circuit 1000 of FIG. 10 is suitable for use in the optical transmitter device of the examples of FIGS. 1, 2, 3A-3C, 4; and/or in performing several of the processes of method 500 of FIG. 5, method 600 of FIG. 6, and/or method 700 of FIG. 7. The integrated circuit 1000 of FIG. 10 may include the illustrated elements of FIGS. 1, 2, 3A-3C, and/or 4 in any form or combination, including omission or addition. The additional features illustrated in FIG. 10 may be combined in examples of the integrated circuit 1000 in any permutation thereof, including omission or addition.

Control element 1008 illustrates a suitable element of any size, shape, and configuration that may compare the output signal 1140 to the input signal 1120 to determine whether the integrated circuit 1000 meets a performance threshold. The control element 1008 may retrieve either of the input signal 1120 and/or the output signal 1140 from the storage device 1008-A, or it may receive either of the two signals directly. While illustrated with a direct line in FIG. 10, the control element 1008 may receive either signal after its modification by another circuit element before and/or after its storing at the storage device 1008-A. The control element 1008 may couple to the regulator 1010 to vary and/or control a threshold voltage 1300 of the regulator 1010, as illustrated in FIG. 10. The control element 1008 may couple to the signal processor 1004 either to vary and/or control a setting of the signal processor 1004 or to measure and/or verify its operation, as illustrated in FIG. 10. The control element 1008 may be substantially the same as the testing element 108 of FIGS. 1, 2, 3A-3C, and 4 and/or it may compare signals in substantially the same way as the testing element 108.

When the integrated circuit 1000 does not meet the performance threshold, the control element 1008 may determine whether the integrated circuit 1000 has exceeded an operating limit. The control element 1008 may perform this process in substantially the same manner as the testing element 108 performs the process of block 626 of FIG. 6 and/or block 726 of FIG. 7. The operating limit may be a limit of the body bias voltage 1140 of the signal processor 1004. When the integrated circuit 1000 has exceeded the operating limit, the control element 1008 may communicate with the storage device 1008-A to recall a set of parameters including a parameter of the supply voltage 1220 and a parameter of the body bias voltage 1240. The control element 1008 may perform this process in substantially the same manner as the testing element 108 performs the process of block 628 of FIG. 6 and/or block 740 of FIG. 7. The set of parameters may include other parameters independent of these voltages, including other operating parameters of the signal processor 1004. The integrated circuit 1000 may continue operation at the set of parameters recalled by the control element 1008. The integrated circuit 1000 may inactive the control element 1008 after it recalls the set of parameters from the storage device 1008-A.

In examples described herein, a processor may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. In examples described herein, at least one processing resource may fetch, decode, and execute instructions stored on a storage medium to perform functionalities described above in relation to instructions stored on a storage medium. In other examples, the functionalities of any of the instructions may be implemented in the form of electronic circuitry, in the form of executable instructions encoded on a machine-readable storage medium, or a combination thereof. As used herein, a storage device or a computer-readable storage device may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any computer-readable storage medium described herein may be non-transitory. In examples described herein, a computer-readable storage medium or media may be part of an article (or article of manufacture). An article or article of manufacture may refer to any manufactured single component or multiple components.

In the foregoing description, numerous details are set forth to provide an understanding of the subject disclosed herein. However, implementations may be practiced without some or all of these details. Other implementations may include modifications and variations from the details as discussed above. The appended claims are intended to cover such modifications and variations.

What is claimed is:

1. An optical transmitter device comprising:
   a driving element to:
      receive a first electrical data signal; and
      provide a second electrical data signal to an optical element based on the first electrical data signal, wherein the optical element is to provide an optical data signal in response to the second electrical data signal, and wherein the driving element operates at a supply voltage;
   a testing element to compare the optical data signal to the first electrical data signal to determine whether the optical transmitter device meets a performance threshold; and
   a regulating element to reduce a magnitude of the supply voltage of the driving element when the device meets the performance threshold.

2. The device of claim 1, wherein the testing element is to provide an instruction to the regulating element to reduce the magnitude of the supply voltage when the device meets the performance threshold.

3. The device of claim 1, wherein the regulating element is to increase a magnitude of a body bias voltage of the driving element when the device fails to meet the performance threshold.

4. The device of claim 3, wherein the body bias voltage of the driving element includes a p-type body voltage and an n-type body voltage, and wherein the regulating element is to reduce a magnitude of the p-type body voltage independently from a magnitude of the n-type body voltage.

5. The device of claim 1, wherein the driving element includes a first driving component that operates at a first supply voltage and a first body bias voltage and a second driving component that operates at a second supply voltage and a second body bias voltage, and wherein the regulating element is to reduce a magnitude of the first supply voltage independently of a magnitude of the second supply voltage, and to increase a magnitude of the first body bias voltage independently of a magnitude of the second body bias voltage.

6. An integrated circuit of an optical transmitter device comprising:
   a signal processor to receive an input signal and to process the input signal to produce an output signal, wherein the signal processor operates at a supply voltage and a body bias voltage;
   a storage device to store a set of parameters including a supply voltage parameter and a body bias voltage parameter of the signal processor when the signal processor meets a performance threshold; and
   a regulator to reduce a magnitude of the supply voltage when the signal processor meets the performance threshold and to increase a magnitude of the body bias voltage when the signal processor does not meet the performance threshold.

7. The integrated circuit of claim 6, including:
   a control element to determine whether the output signal meets the performance threshold based on a comparison of the output signal to the input signal, wherein the control element communicates with the regulator.

8. The integrated circuit of claim 7, including:
   wherein when the output signal does not meet the performance threshold, the control element is to determine whether the integrated circuit has exceeded an operating limit of the integrated circuit, including a limit of body bias voltage of the signal processor; and
   wherein when the integrated circuit has exceeded the operating limit, the control element is to communicate with the storage device to recall the set of parameters including the supply voltage parameter and the body bias voltage parameter of the signal processor.

9. The integrated circuit of claim 8, including:
   wherein the integrated circuit inactivates the control element before the integrated circuit continues performance with operation at the set of parameters.

10. The integrated circuit of claim 7, including:
    wherein the control element regulates independently of the regulator a set of operating settings of the integrated circuit that are distinct from the supply voltage and the body bias voltage of the signal processor.

11. A method comprising:
receiving an electrical data signal by an optical transmitter device;
storing the electrical data signal by a storage device of the optical transmitter device;
producing an optical data signal, in response to the electrical data signal and with an element of the optical transmitter device operating at a first supply voltage and a first body bias voltage;
comparing the optical data signal to the electrical data signal of the storage device to determine whether the optical data signal meets a performance threshold; and
when the optical data signal meets the performance threshold, causing the element of the optical transmitter device to operate at a second supply voltage that is lower in magnitude than the first supply voltage and to continue to operate at the first body bias voltage.

12. The method of claim 11, wherein the optical data signal is a first optical data signal, the method including:
producing a second optical data signal with the element of the optical transmitter device operating at the second supply voltage and the first body bias voltage;
comparing the second optical data signal to the electrical data signal of the storage device to determine whether the second optical data signal meets the performance threshold; and
when the second optical data signal does not meet the performance threshold, causing the element of the optical transmitter device to operate at a second body bias voltage that is higher in magnitude than the first body bias voltage and to continue to operate at the second supply voltage.

13. The method of claim 12, including:
producing a third optical data signal with the element of the optical transmitter device operating at the second supply voltage and the second body bias voltage;
comparing the third optical data signal to the electrical data signal of the storage device to determine whether the third optical data signal meets the performance threshold; and
when the third optical data signal meets the performance threshold, storing a set of last known-good settings of the device, including a known-good supply voltage and a known-good body bias voltage.

14. The method of claim 13, including:
verifying, in response to determining that a subsequent optical data signal does not meet the performance threshold, whether the device has exceeded an operating limit of performance including a maximum body bias voltage of the element; and
when the device has exceeded the operating limit of performance:
recalling, by the device, the set of last known-good settings; and
continuing performance with the device operating with the last known-good settings.

15. The method of claim 11, wherein the comparing includes a comparison test selected from a group consisting of data rate, bit error rate, and extinction ratio.

* * * * *